(12) United States Patent
Yan et al.

(10) Patent No.: US 8,641,949 B2
(45) Date of Patent: Feb. 4, 2014

(54) HIGHLY BASIC IONOMERS AND MEMBRANES AND ANION/HYDROXIDE EXCHANGE FUEL CELLS COMPRISING THE IONOMERS AND MEMBRANES

(75) Inventors: Yushan Yan, Riverside, CA (US); Shuang Gu, Riverside, CA (US); Rui Cai, Liaoning (CN)

(73) Assignee: The Regents of The University of California, Oakland, CA (US)

( * ) Notice: Subject to any disclaimer, the term of this patent is extended or adjusted under 35 U.S.C. 154(b) by 126 days.

(21) Appl. No.: 13/123,477

(22) PCT Filed: Oct. 9, 2009

(86) PCT No.: PCT/US2009/005553
§ 371 (c)(1),
(2), (4) Date: Apr. 8, 2011

(87) PCT Pub. No.: WO2011/043758
PCT Pub. Date: Apr. 14, 2011

(65) Prior Publication Data
US 2011/0237690 A1    Sep. 29, 2011

Related U.S. Application Data

(60) Provisional application No. 61/136,875, filed on Oct. 10, 2008.

(51) Int. Cl.
*B29D 7/00*    (2006.01)

(52) U.S. Cl.
USPC ............. 264/216; 264/240; 264/658; 521/30

(58) Field of Classification Search
USPC .............................. 264/216, 240, 659; 521/30
See application file for complete search history.

(56) References Cited

U.S. PATENT DOCUMENTS 6,828,353 B1 *   12/2004   Charnock et al. ............... 521/27
2012/0119410 A1    5/2012   Yan

OTHER PUBLICATIONS

Wade et al., Journal of the Chemical Society-Chemical Communications, vol. 7, p. 482 (1984).*
S. Gu, R. Cai, T. Luo et al., "A Soluble and Highly Conductive Ionomer for High-Performance Hydroxide Exchange Membrane Fuel Cells", Angew Chem Int Edit 48 (35), 6499-6502 (2009).*
E. Agel, J. Bouet, and J. F. Fauvarque, "Characterization and use of anionic membranes for alkaline fuel cells", Journal of Power Sources 101 (2), 267-274 (2001).*
J. R. Varcoe, R. C. T. Slade, and E. Lain How Yee, "An alkaline polymer electrochemical interface: a breakthrough in application of alkaline anion-exchange membranes in fuel cells",Chemical Communications (13), 1428-1429 (2006).*
L. Li and Y. X. Wang, "Quaternized polyethersulfone Cardo anion exchange membranes for direct methanol alkaline fuel cells", Journal of Membrane Science 262 (1-2), 1-4 (2005).*

(Continued)

*Primary Examiner* — Peter D. Mulcahy
*Assistant Examiner* — Henry Hu
(74) *Attorney, Agent, or Firm* — Schwegman, Lundberg & Woessner, P.A.

(57) ABSTRACT

This invention provides a family of functionalized polymers capable of forming membranes having exceptional $OH^-$ ionic conductivity as well as advantageous mechanical properties. The invention also provides membranes including the provided polymers and AEMFC/HEMFC fuel cells including such membranes. In a preferred embodiment, preferred function groups include a quaternary phosphonium, and in a more preferred embodiment the provided polymer is (tris(2,4,6-trimethoxyphenyl) phosphine)$_3$ functionalized phosphonium polysulfone hydroxide.

18 Claims, 8 Drawing Sheets

(56) References Cited

OTHER PUBLICATIONS

H. Bunazawa and Y. Yamazaki, "Influence of anion ionomer content and silver cathode catalyst on the performance of alkaline membrane electrode assemblies (MEAs)for direct methanol fuel cells (DMFCs)", Journal of Power Sources 182 (1), 48 (2008).

E. Avram, E. Butuc, C. Luca, I. Druta, "Polymers with Pendant Functional Group.III. Polysulfones Containing Viologen Group" Journal of Macromolecular Science-Pure and Applied Chemistry A34, 1701 (1997).

E. Agel, J. Bouet, and J. F. Fauvarque, "Characterization and use of anionic membranes for alkaline fuel cells", Journal of Power Sources 101 (2), 267 (2001).

V. Cozan and E. Avram, "Side chain thermotropic liquid crystalline polysulfone obtained from polysulfone udel by chemical modification", European Polymer Journal 39 (1), 107 (2003).

C. Coutanceau, L. Demarconnay, C. Lamy et al., "Development of electrocatalysts for solid alkaline fuel cell (SAFC)", Journal of Power Sources 156 (1), 14 (2006).

J. Fang and P. K. Shen,"Quaternized poly(phthalazinon ether sulfone ketone) membrane for anion exchange membrane fuel cells", J Membrane Sci 285 (1-2), 317 (2006).

T. D. Gierke, G. E. Munn, and F. C. Wilson, "The Morphology in Nafion Perfluorinated Membrane Products, as Determined by Wide- and Small-Angle X-Ray Studies", J Polym Sci Pol Phys 19 (11), 1687 (1981).

S. Gu, R. Cai, T. Luo et al., "A Soluble and Highly Conductive Ionomer for High-Performance Hydroxide Exchange Membrane Fuel Cells", Angew Chem Int Edit 48 (35), 6499 (2009).

Hiroyuki Yanagi and Kenji Fukuta, "Anion Exchange Membrane and Ionomer for Alkaline Membrane Fuel Cells (AMFCs)", ECS Trans 16 (2), 257 (2008).

H. Y. Hou, G. Q Sun, R. H. He et al.,"Alkali doped polybenzimidazole membrane for high performance alkaline direct ethanol fuel cell", Journal of Power Sources 182 (1), 95 (2008).

C. Lamy, E. M. Belgsir, J. M. Leger, "Electrocatalytic oxidation of aliphatic alcohols: Application to the direct alcohol fuel cell (DAFC)", Journal of Applied Electrochemistry 31, 799 (2001).

L. Li and Y. X. Wang, "Quaternized polyethersulfone Cardo anion exchange membranes for direct methanol alkaline fuel cells", Journal of Membrane Science 262 (1-2), 1 (2005).

S. F. Lu, J. Pan, A. B. Huang et al., "Alkaline polymer electrolyte fuel cells completely free from noble metal catalysts", P Natl Acad Sci Usa 105 (52), 20611 (2008).

K. Matsuoka, Y. Iriyama, T. Abe et al., "Alkaline direct alcohol fuel cells using an anion exchange membrane", Journal of Power Sources 150, 27 (2005).

J. S. Park, S. H. Park, S. D. Yim et al., "Performance of solid alkaline fuel cells employing anion exchange membranes", J Power Sources 178 (2), 620 (2008).

Jin-Soo Park, Gu-Gon Park, Seok-Hee Park et al., Development of Solid-State Alkaline Electrolytes for Solid Alkaline Fuel Cells, Macromol Symp 249-250 (1), 174 (2007).

R. C. T. Slade and J. R. Varcoe, "Investigations of conductivity in FEP-based radiation-grafted alkaline anion-exchange membranes", Solid State Ionics 176 (5-6), 585 (2005).

D. Stoica, L. Ogier, L. Akrour et al., "Anionic membrane based on polyepichlorhydrin matrix for alkaline fuel cell: Synthesis, physical and electrochemical properties", Electrochim Acta 53 (4), 1596 (2007).

J. R. Varcoe, R. C. T. Slade, E. L. H. Yee et al., "Poly(ethylene-co-tetrafluoroethylene)-Derived Radiation-Grafted Anion-Exchange Membrane with Properties Specifically Tailored for Application in Metal-Cation-Free Alkaline Polymer Electrolyte Fuel Cells", Chem Mater 19 (10), 2686 (2007)1_.

J. R. Varcoe and R. C. T. Slade, "An electron-beam-grafted ETFE alkaline anion-exchange membrane in metal-cation-free solid-state alkaline fuel cells", Electrochemistry Communications 8 (5), 839 (2006).

J. R. Varcoe, R. C. T. Slade, and E. Lam How Yee, "An alkaline polymer electrochemical interface: a breakthrough in application of alkaline anion-exchange membranes in fuel cells",Chemical Communications (13), 1428 (2006).

A. Verma and S. Basu, "Direct alkaline fuel cell for multiple liquid fuels: Anode electrode studies", Journal of Power Sources 174 (1), 180 (2007).

J. R. Varcoe and R. C. T. Slade, "Prospects for Alkaline Anion-Exchange Membranes in Low Temperature Fuel Cells", Fuel Cells 5 (2), 187 (2005).

M. Wada and S. Higashizaki, "A Highly Basic Triphenylphosphine, [2,4,6-(Me0)3C6H2]3P", Journal of the Chemical Society-Chemical Communications (7), 482 (1984).

Y. Wang, L. Li, L. Hu et al., "A feasibility analysis for alkaline membrane direct methanol fuel cell: thermodynamic disadvantages versus kinetic advantages", Electrochemistry Communications 5 (8), 662 (2003).

E. H. Yu and K. Scott, "Development of direct methanol alkaline fuel cells using anion exchange membranes", Journal of Power Sources 137 (2), 248 (2004).

E. H. Yu and K. Scott, "Direct methanol alkaline fuel cells with catalysed anion exchange membrane electrodes", Journal of Applied Electrochemistry 35 (1), 91 (2005).

Y. Xiong, J. Fang, Q. H. Zeng et al., "Preparation and characterization of cross-linked quaternized poly(vinyl alcohol) membranes for anion exchange membrane fuel cells", J Membrane Sci 311 (1-2), 319 (2008).

H. W. Zhang and Z. T. Zhou, "Alkaline Polymer Electrolyte Membranes from Quaternized Poly(phthalazinone ether ketone) for Direct Methanol Fuel Cell", J Appl Polym Sci 110 (3), 1756 (2008).

* cited by examiner

US 8,641,949 B2

HIGHLY BASIC IONOMERS AND MEMBRANES AND ANION/HYDROXIDE EXCHANGE FUEL CELLS COMPRISING THE IONOMERS AND MEMBRANES

CROSS-REFERENCE TO RELATED APPLICATION

This application is the U.S. national stage under 35 USC §371 of International Application Number PCT/US2009/05553, filed on Oct. 9, 2009 which claims priority to U.S. Provisional Patent Application No. 61/136,875 filed on Oct. 10, 2008, the entire contents of which applications are hereby incorporated by reference.

FIELD OF THE INVENTION

The present invention relates to the field of fuel cells and specifically to anion/hydroxide exchange membrane fuel cells (AEMFCs/HEMFCs). It provides a family of polymers/ionomers capable of forming membranes having exceptional OH$^-$ ionic conductivity as well as advantageous mechanical properties. The invention also provides membranes including the provided polymers/ionomers and AEMFC/HEMFC fuel cells incorporating such membranes.

BACKGROUND OF THE INVENTION

Anion/hydroxide exchange membrane fuel cells (AEMFCs/HEMFCs) have received increasing attention due to their dominant advantages such as (a) more facile fuel oxidation and oxygen reduction in high pH media, (b) electro osmotic drag by OH$^-$ from cathode to anode, which not only reduces fuel crossover but also realizes anode drainage, and (c) complete elimination of the crippling bi/carbonate contamination problem of traditional liquid alkaline fuel cells (AFCs) whose electrolyte contains free metal cations. See, e.g., C. Lamy, E. M. Belgsir, J. M. Leger, Journal of Applied Electrochemistry 31, 799 (2001); Y. Wang, L. Li, L. Hu et al., Electrochemistry Communications 5 (8), 662 (2003); J. R. Varcoe and R. C. T. Slade, Fuel Cells 5 (2), 187 (2005).

A suitable anion/hydroxide exchange ionomer (i.e., a charged polymer) is crucial and of foremost importance to build three-phase boundaries in the electrodes. Unfortunately, unlike high performance acid Nafion ionomer for proton exchange membrane fuel cells (PEMFCs), high performance hydroxide exchange ionomer has not heretofore been available for AEMFCs/HEMFCs. This greatly limits AEMFCs/HEMFCs' performance and development.

Due to the lack of a solid ionomer, KOH or NaOH aqueous solution has been used in the electrodes, which limits advantages of AEMFCs/HEMFCs over traditional AFCs. See, e.g., K. Matsuoka, Y. Iriyama, T. Abe et al., Journal of Power Sources 150, 27 (2005); E. H. Yu and K. Scott, Journal of Power Sources 137 (2), 248 (2004); E. Agel, J. Bouet, and J. F. Fauvarque, Journal of Power Sources 101 (2), 267 (2001); L. Li and Y. X. Wang, Journal of Membrane Science 262 (1-2), 1 (2005); C. Coutanceau, L. Demarconnay, C. Lamy et al., Journal of Power Sources 156 (1), 14 (2006). Non ionic conductive PTFE has also been used as ionomer, which doesn't provide OH$^-$ transfer in the electrode at all. See, e.g., E. H. Yu and K. Scott, Journal of Applied Electrochemistry 35 (1), 91 (2005). Sometimes acid Nafion ionomer was used as ionomer, which restrains the OH$^-$ transfer in the electrode dramatically. See, e.g., H. Y. Hou, G. Q. Sun, R. H. He et al., Journal of Power Sources 182 (1), 95 (2008); A. Verma and S. Basu, Journal of Power Sources 174 (1), 180 (2007).

Recently, an insoluble cross linked di-amine quaternized polyvinyl benzyl electrochemical interface was prepared to enhance HEMFC performance. See, e.g., J. R. Varcoe, R. C. T. Slade, and E. Lam How Yee, Chemical Communications (13), 1428 (2006); J. R. Varcoe and R. C. T. Slade, Electrochemistry Communications 8 (5), 839 (2006). But this polymer is not a soluble ionomer, and thus it cannot be used to effectively build three-phase boundaries in electrodes, and as a result the HEMFC performance is still far limited. In addition, its ionic conductivity and stability is also limited due to its alkaline quaternary ammonium hydroxide group. Very recently, a soluble alkaline ionomer, A3-solution (Tokuyama) was reported; however, its chemical structure, preparation method, and characterized properties such as ionic conductivity, stability, and fuel cell performance, are unknown. See, e.g., H. Bunazawa and Y. Yamazaki, Journal of Power Sources 182 (1), 48 (2008).

SUMMARY OF THE INVENTION

This invention provides a family of polymers capable of forming membranes having exceptional OH$^-$ ionic conductivity as well as advantageous mechanical properties. The invention also provides membranes including the provided polymers and AEMFC/HEMFC fuel cells including such membranes. The provided polymers typically carry a positive charge, and therefore are also referred to herein as "ionomers".

Specifically, a new soluble alkaline ionomer, tris(2,4,6-trimethoxyphenyl)phosphine based quaternary phosphonium polysulfone hydroxide (TPQPOH), has been synthesized and used successfully to prepare anion exchange membranes and fuel cells. The TPQPOH hydroxide exchange membrane has been discovered to have significantly high hydroxide conductivity along with advantageous alkaline and temperature stability. The following table makes apparent the surprising nature of the discovery.

TABLE 1

Comparison between polysulfone functionalized with three types of quaternary phosphonium functional group

| Quaternary phosphonium | Hydroxide conductivity (mS/cm @ 20° C., S = Siemens) | Stability in water |
|---|---|---|
| —Bu$_3$P$^+$ (DC: 130%) | 0.3 | Unstable |
| —Ph$_3$P$^+$ (DC: 130%) | 1.0 | Stable |
| -(2,4,6-MeO$_3$Ph)$_3$P$^+$ (TPQPOH, DC: 124%-152%) | 27-45 | Extremely stable |

The ionomer of the invention has hydroxide conductivity one to two orders of magnitude greater than the closely related alkyl and phenyl phosphonium functionalized ionomers.

Briefly, TPQPOH was synthesized by chloromethylation and quaternary phosphorization two-step method. Differing from the current and dominant quaternary ammonium hydroxide group, the TPQPOH contains quaternary phosphonium hydroxide functional group, and it not only provides the OH$^-$ transfer but also has excellent solubility. Owing to the extremely high basicity (pK$_b$: 2.8) and large molecular size, tris(2,4,6-trimethoxyphenyl)phosphine (TTMOPP) as the tertiary phosphine ligand, provides the TPQPOH extremely high ionic conductivity and excellent alkaline and temperature stability. See, e.g., M. Wada and S. Higashizaki, Journal of the Chemical Society-Chemical Communications (7), 482 (1984).

In one embodiment, the invention provides a highly basic ionomer comprising $[M1(-B^+)_x]_n(OH^-)_m$, wherein M1 is a polymer-forming monomer comprising an aromatic moiety or a plurality of such monomers at least one of which comprises an aromatic moiety and $B^+OH^-$ is a highly basic functional group having a $pK_b$ of 0.2 or smaller.

In another embodiment, the present invention provides a highly basic ionomer having a polymer backbone including aromatic moieties and a plurality of highly basic functional groups, $B^+OH^-$, having a $pK_b$ of between −2.0-2.0, the ionomer being represented by the scheme $[M1(-B^+)_x]_n(OH^-)_m$ wherein x is preferably between approximately 0.1 and 2.0.

In specific embodiments, the ionomer of claim 1 has an M3 configured linking M1 and $B^+$, wherein M3 is selected from —(CR'R")$_n$—, —Ar— (aromatic), and -substituted —Ar—, and wherein n is 1,2, or 3 and wherein R' and R" are independently selected from H, a halogen, a short chain alkyl, and a halogenated short chain alkyl, or includes at least one quaternary $X^+$, where X is selected from P, As, and Sb, or S, Se and Te.

In specific embodiments, the highly basic functional group, $B^+$, can be represented by the scheme $(R'R"R''')P^+$, wherein one or more of R', R", and R''' is independently selected from an electron donating group, or wherein one or more of R', R", and R''' can be independently an unshared electron pair adjacent to X or an unshared electron pair adjacent to an unsaturated system adjacent to X, or wherein one or more of R', R", and R''' is independently selected from —OR, —OH, —NH$_2$, —NHR, —NR$_2$, —NHCOR, —OCOR, —SR, —SH, —R, —Br, and —I with R being selected from short chain alkyl or a phenyl, or wherein one or more of R', R", and R''' can independently be a group selected from Ar (aromatic) and an Ar further having electron donating substituents. Preferably, R' or R" or R''' can be (2,4,6-RO)$_3$Ph wherein R is selected from a short chain alkyl or allyl.

In specific embodiments, the ionomer of the invention is selected from one or more of polysulfone, polystyrene, poly (ether sulfone), poly(phenolphthalein ether sulfone, poly (ether ketone), poly(ether ketone)-cardo, poly(ether ether ketone), poly(ether ether ketone ketone), poly(phthazinone ether sulfone ketone), polyetherimide, and poly(phenylene oxide), and the polymer backbone of the ionomer can include a first monomer and a second monomer in approximately equal mol ratios.

The present invention also provides ionomers having one or more pairs of cross linked polymer backbones. In specific embodiments, at least one pair of polymer backbones are linked by at least one —($B^+$)$^-$ group, or at least one short chain alkyl.

The present invention also provides methods of making (tris(2,4,6-trimethoxyphenyl) phosphine)$_x$ based quaternary phosphonium polysulfone hydroxide (TPQPOH-x) that, first, chloromethylate polysulfone (PSf) dissolved in an inert solvent for a selected reaction time, and second, combine tris(2, 4,6-trimethoxyphenyl)$_3$ phosphine (TTMOPP)$^+$Y$^-$ and chloromethylated polysulfone (CMPSf) in a polar, aprotic solvent under conditions leading to synthesis of (tris(2,4,6-trimethoxyphenyl) phosphine)$_x$ based quaternary phosphonium polysulfone hydroxide, wherein Y$^-$ comprises a leaving group suitable ion exchange such as a halogen. Preferably, the mol ratio of chloromethylene groups to polysulfone monomers (degree of chloromethylation (DC)) is measured by $^1$HNMR.

In specific embodiments, PSf can be chloromethylated in the presence of chloromethylating agents and under conditions leading to the synthesis of (PSf) methylene chloride, or the chloromethylation reaction time to achieve a predetermined DC between 0 (0%) and 2 (200%).

In specific embodiments, TTMOPP and CMPSf can be combined at a mol ratio of TTMOPP to CMPSf chloromethylene groups so that substantially all TTMOPP molecules are each linked to at most one polysulfone polymer chain, for example a mol ratio equal to or greater than about 1 but less than about 2. In specific embodiments, TTMOPP and CMPSf are combined at a mol ratio of TTMOPP to the chloromethylene groups in CMPSf so that at least one pair of polysulfone polymer chains are linked to the same TTMOPP group, for example a mol ratio between about 0.5 and about 0.95.

In specific embodiments, (tris(2,4,6-trimethoxyphenyl) phosphine)$_x$ based quaternary phosphonium polysulfone hydroxide can be combined with a multi-halogenated short chain alkyl under conditions leading to linking short chain alkyls to two or more TTMOPP groups.

The present invention also provides an anion/hydroxide exchange membrane configured and sized to be suitable for use in a fuel cell and including an ionomer of this invention, preferably (tris(2,4,6-trimethoxyphenyl) phosphine)$_x$ based quaternary phosphonium polysulfone hydroxide (TPQPOH), wherein x is between about 0 and 2.

In specific embodiments, the membrane includes an ionomer wherein the ratio of TTMOPP groups bound to each (PSf) monomer in TPQPOH is DC, and wherein DC is selected so that the ionic hydroxide conductivity of the membrane is greater than about 20 mS/cm greater than about 40 mS/cm, and wherein the number of TTMOPP groups bound to two (PSf) ionomer chains in TPQPOH is DSCL, and wherein DSCL is selected so that the degree of swelling is less than about 15%.

The present invention also provides an anion/hydroxide exchange membrane fuel cell including an ionomer of this invention, and preferably where the ionomer is (tris(2,4,6-trimethoxyphenyl) phosphine)$_x$ based quaternary phosphonium polysulfone hydroxide.

A principal application for this invention is expected to be for hydroxide exchange membrane fuel cells (energy conversion). However, the pristine/cross-linked quaternary-phosphonium functionalized anion/hydroxide exchange ionomers and membranes of this invention can be used for many other purposes such as: dialysis/electrodialysis; desalination of sea/brackish water; demineralization of water; ultra-pure water production; waste water treatment; concentration of electrolytes solution in food, drug, chemical, and biotechnology fields; electrolysis (e.g., chlor-alkali production and $H_2/O_2$ production); energy storage (e.g., super capacitors and redox batteries); sensors (e.g., pH/RH sensors); and in other applications where an anion-conductive ionomer is advantageous.

Headings are used herein for clarity only and without any intended limitation. A number of references are cited herein, the entire disclosures of which are incorporated herein, in their entirety, by reference for all purposes. Further, none of the cited references, regardless of how characterized above, is admitted as prior to the invention of the subject matter claimed herein. Further aspects and details and alternate combinations of the elements of this invention will be apparent from the following detailed description and are also within the scope of the inventor's invention.

BRIEF DESCRIPTION OF THE DRAWINGS

The present invention may be understood more fully by reference to the following detailed description of the preferred embodiment of the present invention, illustrative examples of specific embodiments of the invention and the appended figures in which.

| electrolyte membrane polymer acronym | QAOH functionalized polymer name |
|---|---|
| ETFE-g-QAOH (◆) (4-1) | radiation-grafted poly(ethylene-co-terafluoroethylene) |
| FEP-g-QAOH (■) (4-2) | radiation-grafted poly(hexafluoropropylene-co-tetrafluoroethylene) |
| PEAGE-QAOH (▶) (4-3) | poly(epichlorhydrin-ally glycidyl ether) |
| PEI-QAOH (★) (4-4) | poly(ether imide) |
| PESC-QAOH (◀) (4-5) | poly(phenolphthalein ether sulfone |
| PPO-QAOH (▲%) (4-6) | poly(2,6-dimethyl-1,4-phenylene oxide) |
| PSf-QAOH (▼) (4-7) | polysulfone |
| A801 (•) (4-8) | commercial HEM produced by Tokuyama Co. |
| FAA (∘) (4-9) | commercial HEM produced by Fuma-Tech GmbH |
| The red-dotted line (4-10) | |

Figure 5:
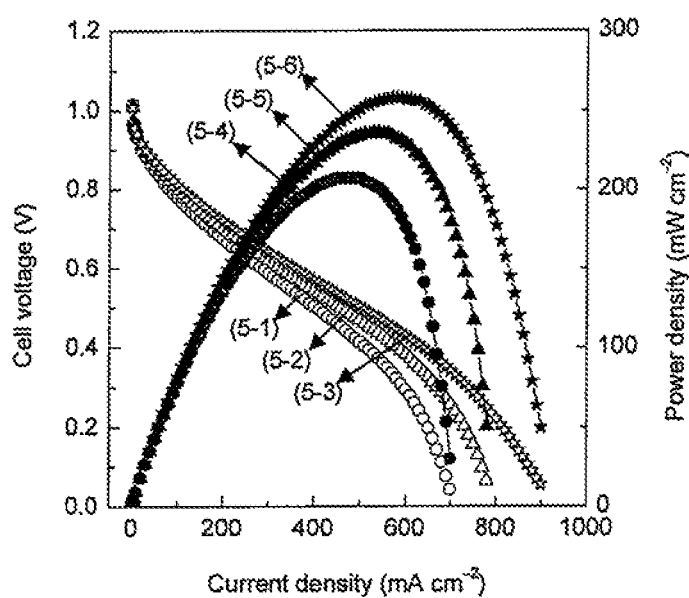
Figure 6:
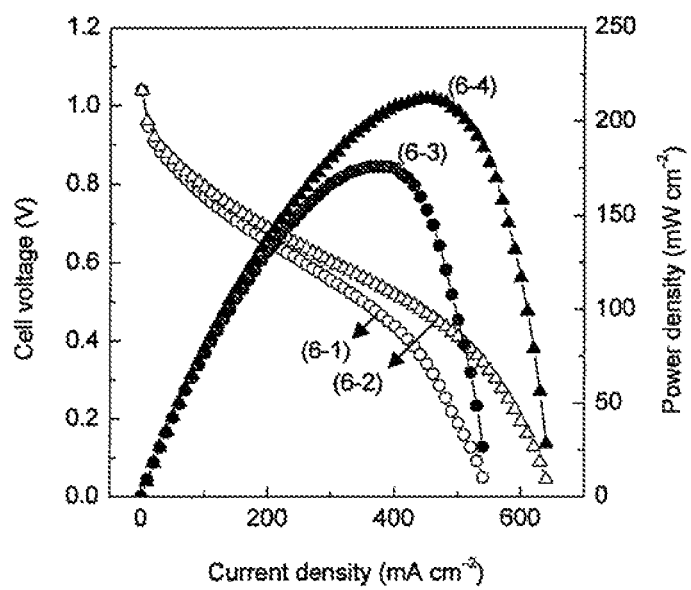
Figure 7:
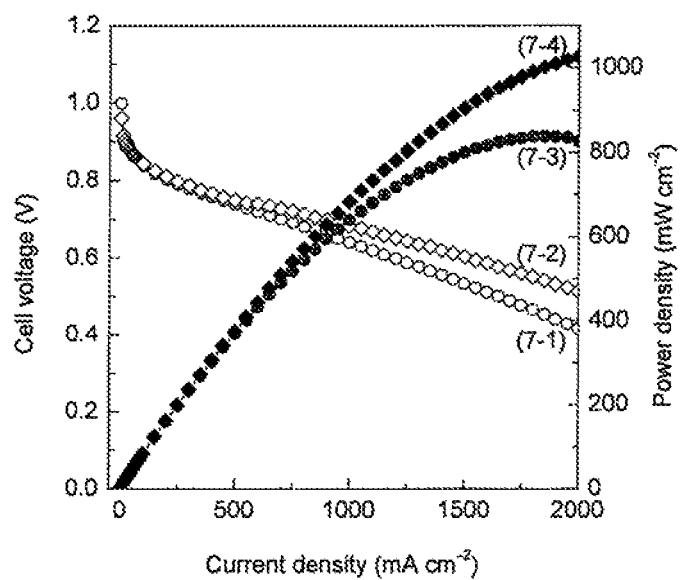
Figure 8:
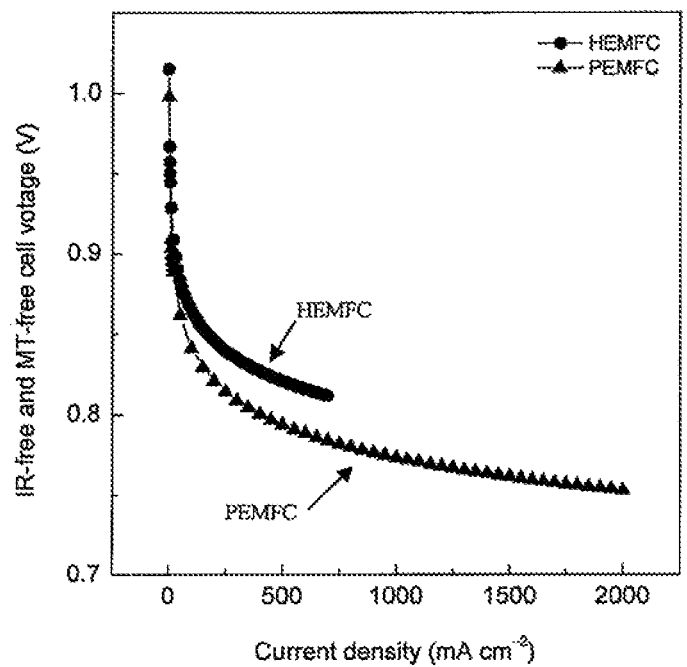
Figure 9:
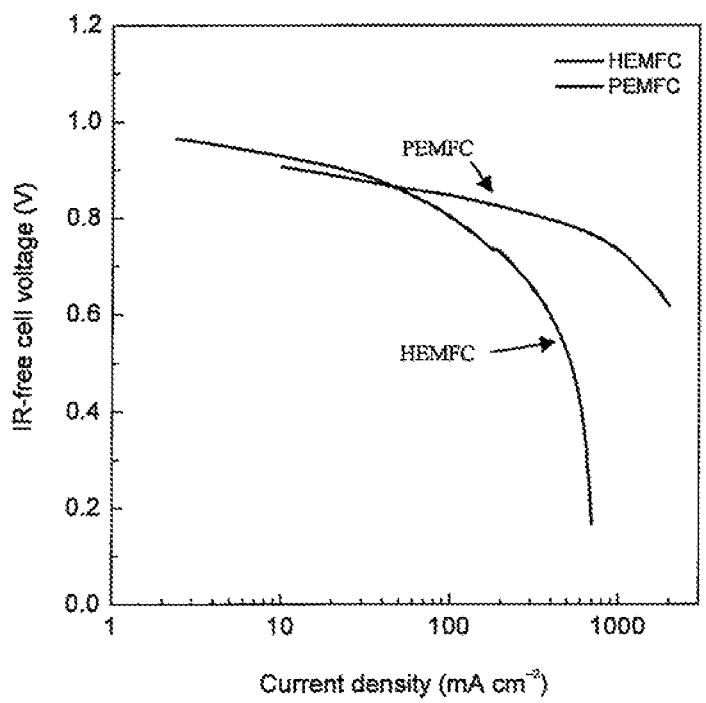

FIG. 5 illustrates polarization curves (open symbols) at cell temperatures of 50° C. (5-1), 60° C. (5-2), 70° C. (5-3) and power density (solid symbols) and at cell temperatures of 50° C. (5-4), 60° C. (5-5), 70° C. (5-6), both sets of curves being for a 50 μm TPQPOH152 HEM (hydroxide exchange membrane) incorporated HEMFC;

FIG. 6 illustrates polarization curves (open symbols) at cell temperatures of 50° C. (6-1) and 60° C. (6-2) and power density curves (solid symbols) and at cell temperatures of 50° C. (6-3) and 60° C. (6-4), both sets of curves being for a 100 μm TPQPOH152 HEM incorporated HEMFC;

FIG. 7 illustrates polarization curves (open symbols) at cell temperatures of 50° C. (7-1) and 80° C. (7-2) and power density curves (solid symbols) and at cell temperatures of 50° C. (7-3) and 80° C. (7-4), both sets of curves being for a 50 μM Nafion212 PEM (proton exchange membrane) incorporated PEMFC;

FIG. 8 illustrates comparison of IR-free (internal resistance) and MT-free (mass transport) cell voltage between TPQPOH152 HEM incorporated HEMFC and Nafion212 PEM incorporated PEMFC;

FIG. 9 illustrates comparison of IR-free cell voltage between TPQPOH152 HEM incorporated HEMFC and Nafion212 PEM incorporated PEMFC.

Figure 2A:
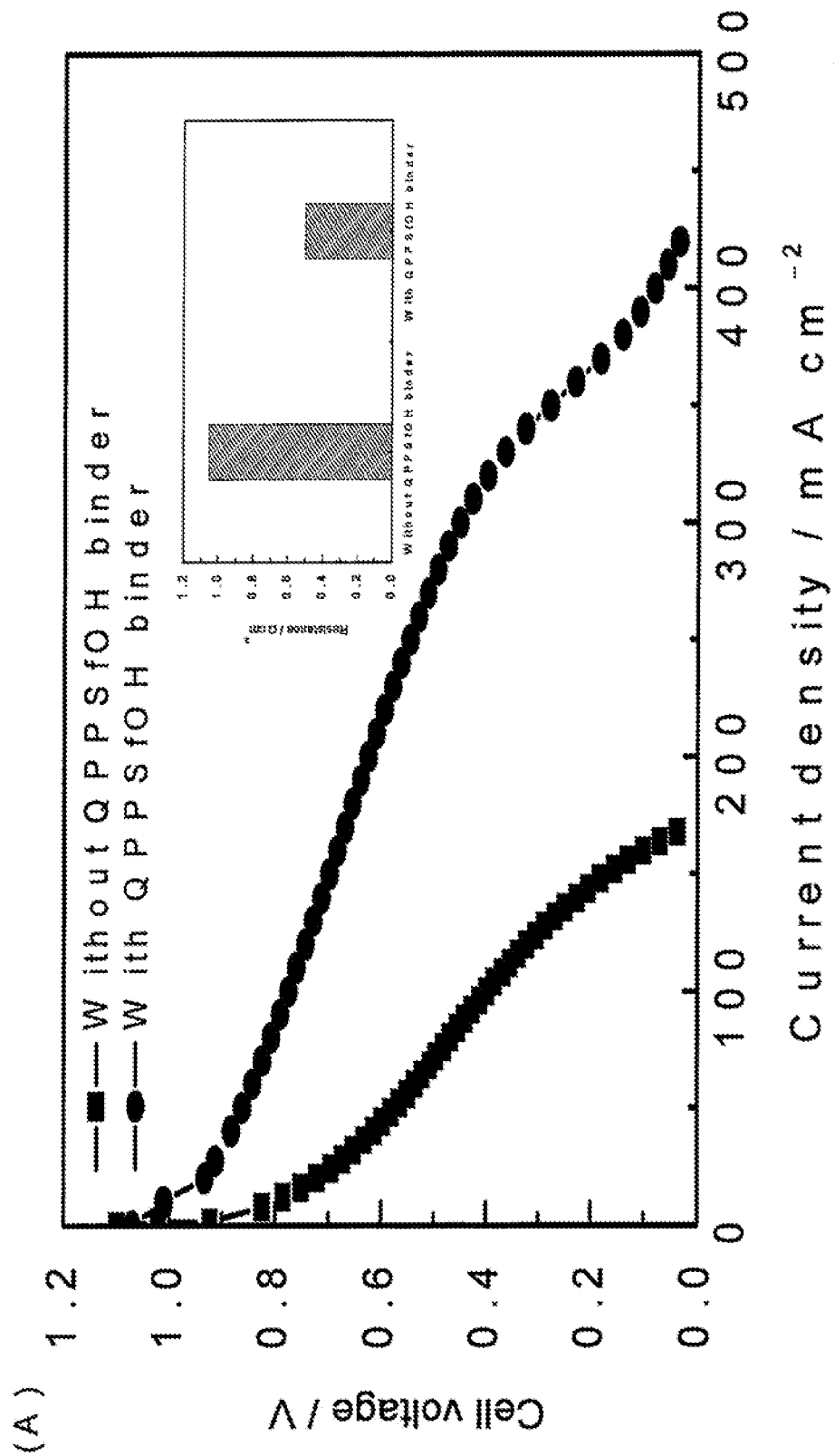
FIG. 2A illustrates polarization curves of HEMFC with (2-1) and without (2-2) TPQPOH ionomer. Inset: Resistances of MEA (membrane electrode assembly) of HEMFC with (2-3) and without (2-4) TPQPOH ionomer.
Figure 2:
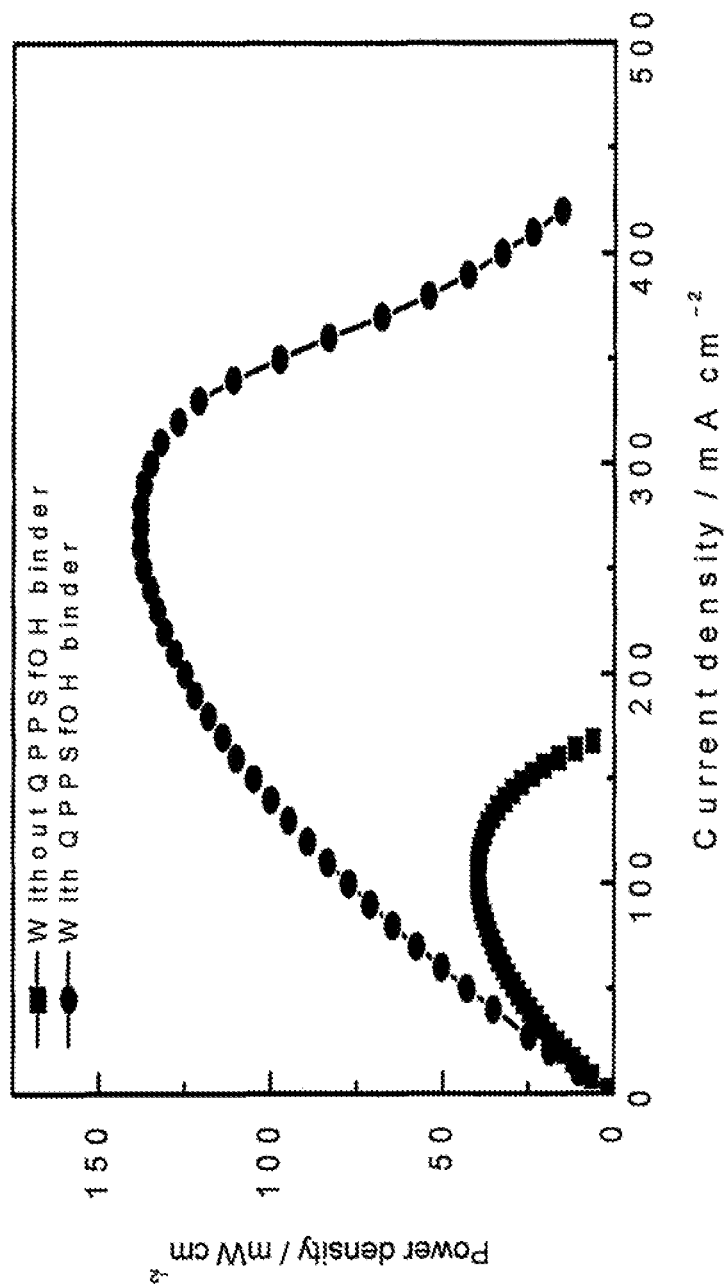
FIG. 2B illustrates power densities of HEMFC with (2-5) and without (2-6) TPQPOH ionomer.
Figure 3:
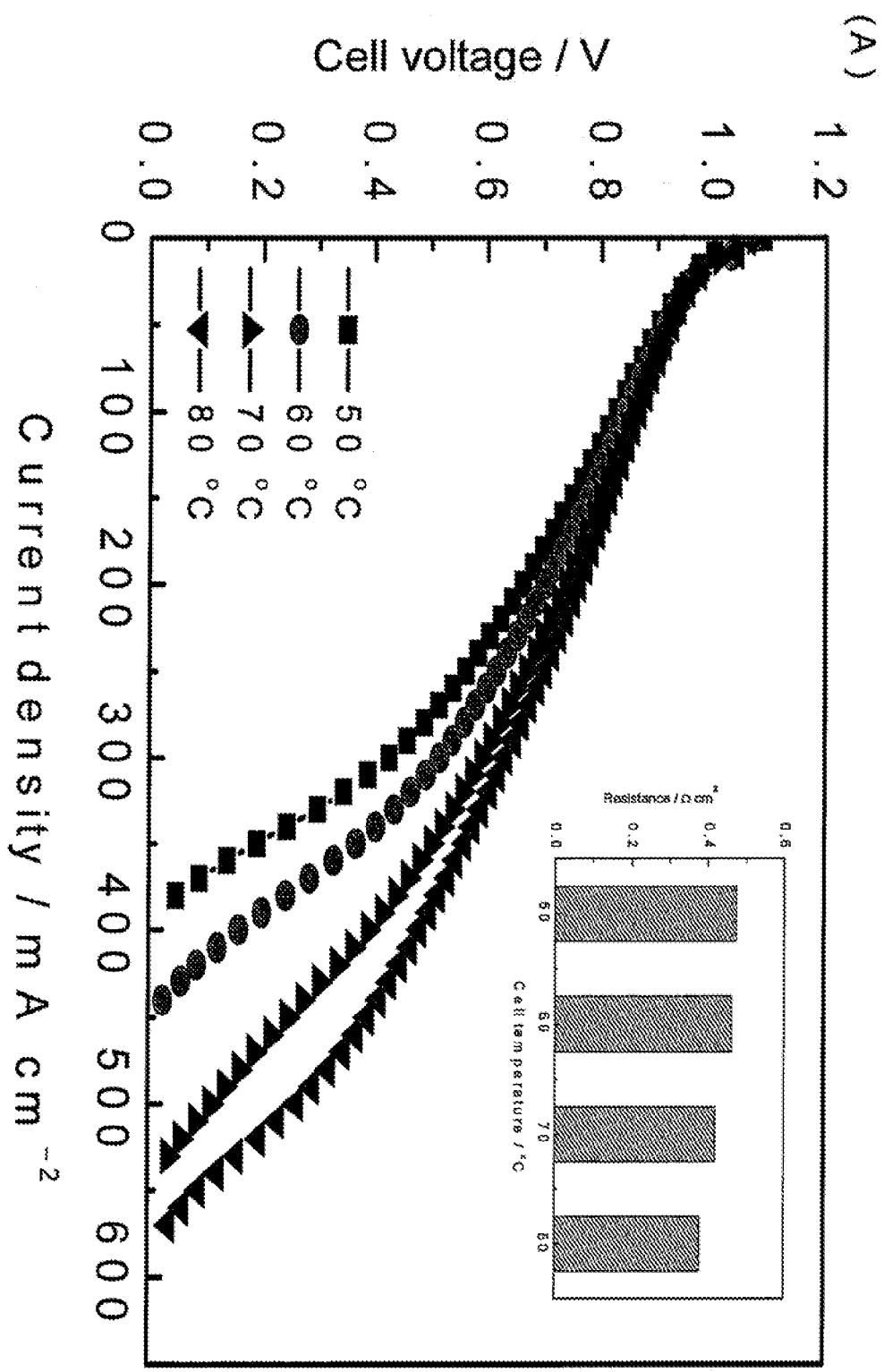
FIG. 3A illustrates polarization curves of HEMFC with TPQPOH ionomer at cell temperatures of 50° C. (3-1), 60° C. (3-2), 70° C. (3-3), 80° C. (3-4). Inset: Resistances of MEA of HEMFC with TPQPOH ionomer at cell temperatures of 50° C. (3-5), 60° C. (3-6), 70° C. (3-7), 80° C. (3-8)
FIG. 3B illustrates power densities of HEMFC with TPQPOH ionomer at cell temperatures of 50° C. (3-9), 60° C. (3-10), 70° C. (3-11), 80° C. (3-12)
Figure 3B:
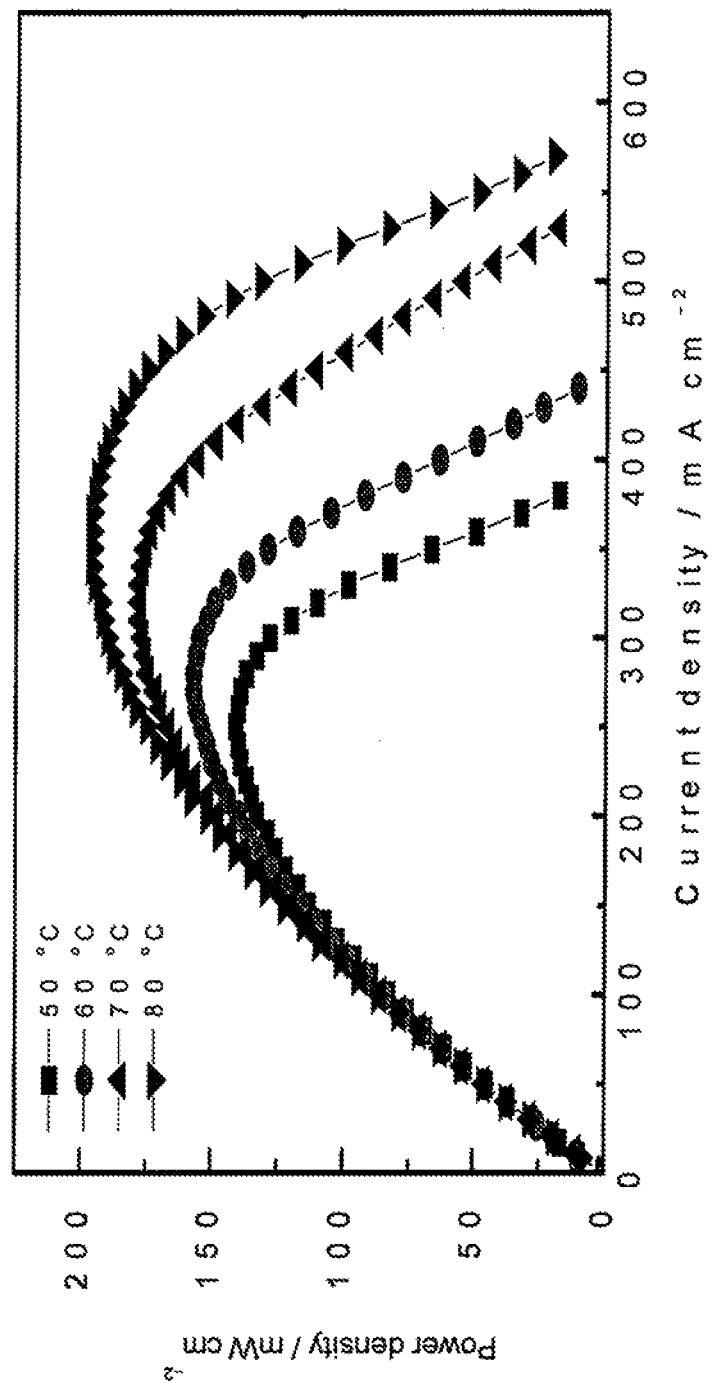

The test conditions for the figures are as follows:

FIGS. 2A-B: anode and cathode electrodes, respectively, 0.2 mg Pt (Pt black) $cm^{-2}$ and 0.05 mg TPQPOH $cm^{-2}$; cell temperature of 50° C.; $H_2$ and $O_2$ flows are humidified at temperatures of 70° C. and 80° C., respectively, at flow rates of 0.2 L $min^{-1}$, and at back pressures of 250 kPa; the electrolyte membranes are 70 μm thick FT-FAA (FuMA-Tech, GmbH);

FIGS. 3A-B: anode and cathode electrodes, respectively, 0.5 mg Pt (Pt black) $cm^{-2}$ and 0.125 mg TPQPOH $cm^{-2}$; cell temperatures of 50° C., 60° C., 70° C., and 80° C.; $H_2$ and $O_2$ flows are humidified at temperatures 70° C. and 80° C., respectively, at flow rates of 0.2 L $min^{-1}$, and at back pressures of 250 kPa; the electrolyte membranes are 70 μm thick FT-FAA;

FIG. 5: anode and cathode electrodes, respectively, 0.2 mg Pt (Pt black) $cm^{-2}$ and 0.05 mg TPQPOH $cm^{-2}$; cell temperatures of 50° C., 60° C., 70° C.; $H_2$ and $O_2$ flows are humidified at temperatures of 70° C. and 80° C., respectively, at flow rates of 0.2 L $min^{-1}$, and at back pressures of 250 kPa; TPQPOH152 membrane thickness of 50 μm;

FIG. 6: anode and cathode electrodes, respectively, 0.2 mg Pt (Pt black) $cm^{-2}$ and 0.05 mg TPQPOH $cm^{-2}$; cell temperatures of 50° C. and 60° C.; $H_2$ and $O_2$ flows are humidified at temperatures 70° C. and 80° C., respectively, at flow rates of 0.2 L $min^{-1}$, and at back pressures of 250 kPa; TPQPOH152 membrane thickness of 100 μm;

FIG. 7: anode and cathode electrodes, respectively, 0.2 mg Pt (Pt/C 20 wt %) $cm^{-2}$ and 0.54 mg Nafion212 $cm^{-2}$; cell temperatures of 50° C. and 80° C.; $H_2$ and $O_2$ flows are humidified at temperatures 70° C. and 80° C., respectively, at flow rates of 0.2 L $min^{-1}$, and at back pressures of 250 kPa; the electrolyte is 50 μm thick Nafion212;

FIG. 8: anode and cathode electrodes, respectively, 0.2 mg Pt $cm^{-2}$ of Pt black for HEMFC (Pt black) and Pt/C 20 wt. % for PEMFC; cell temperature of 50° C.; $H_2$ and $O_2$ flows are at flow rates of 0.2 L $min^{-1}$, and at back pressures of 250 kPa; the electrolyte membranes are 50 μm TPQPOH152 for HEMFC and 50 μm Nafion212 for PEMFC;

FIG. 9: anode and cathode electrodes, respectively, 0.2 mg $cm^{-2}$ of Pt black for HEMFC and Pt/C 20 wt. % for PEMFC; cell temperature of 50° C.; $H_2$ and $O_2$ flows are at flow rates of 0.2 L $min^{-1}$, and at back pressures of 250 kPa.

DETAILED DESCRIPTION OF THE PREFERRED EMBODIMENTS

This invention is a family of membrane-forming polymers having exceptional $OH^-$ ionic conductivity by virtue of their being functionalized with, preferably highly, basic groups. Membranes formed from the polymers of this invention has applicability in many areas such as but not limited to high-performance HEMFCs. The other applicability, for example, includes dialysis/electrodialysis; desalination of sea/brackish water; demineralization of water; ultra-pure water production; waste water treatment; concentration of electrolytes solution in food, drug, chemical, and biotechnology fields; electrolysis (e.g., chlor-alkali production and $H_2/O_2$ production); energy storage (e.g., super capacitors and redox batteries); sensors (e.g., pH/RH sensors); and in other applications where an anion-conductive ionomer is advantageous.

Fuel Cell Structure and Electrolyte Membranes

Figure 1:
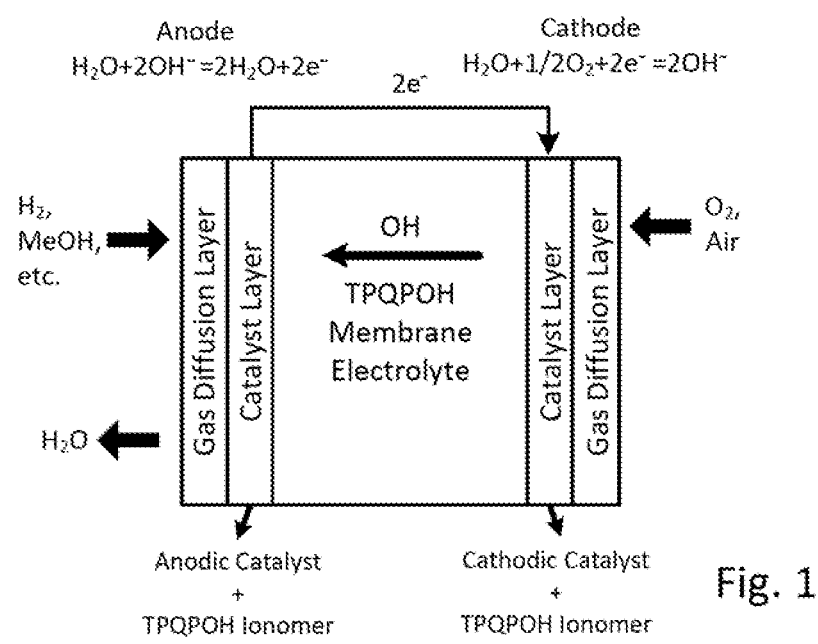
FIG. 1 illustrates an exemplary HEMFC fuel cell of this invention.

Accordingly and by way of background, the structure of a typical fuel cell and the significance of the electrolyte membrane to performance are now described. FIG. 1 illustrates a typical fuel cell with an anode portion (illustrated on the left) and a cathode portion (illustrated here on the right) which are separated by an electrolyte; supporting members are not illustrated. The anode portion carries out an anode half-reaction which oxidizes fuel releasing electrons to an external circuit and producing oxidized products; the cathode portion carries out a cathode half-reaction which reduces an oxidizer consuming electrons from the external circuit. The gas diffusion layers (GDL) serve to deliver the fuel and oxidizer uniformly across the catalyst layer. Charge neutrality is maintained by a flow of ions from the anode to the cathode for positive ions and from cathode to anode for negative ions. The dimension illustrated here is for convenience and is not representative, as the electrolyte membrane is usually selected to be as thin as possible consistent with membrane structural integrity.

In the case of the illustrated hydroxide exchange membrane fuel cell (HEMFC), the anode half-reaction consumes fuel and $OH^-$ ions and produces waste $H_2O$ (also $CO_2$ in the case of carbon containing fuels); the cathode half reaction consumes $O_2$ and produces $OH^-$ ions; and $OH^-$ ions flow from the cathode to the anode through the electrolyte membrane. Fuels are limited only by the oxidizing ability of the anode catalyst but typically can include $H_2$, MeOH, EtOH, ethylene glycol, glycerol, and similar compounds. Catalysts are usually Pt or based on Ag or one or more transition metals, e.g., Ni. In the case of a PEMFC, the anode half-reaction consumes fuel and produces $H^+$ ions and electrons; the cathode half reaction consumes $O_2$, $H^+$ ions, and electrons and produces waste $H_2O$; and $H^+$ ions (protons) flow from the anode to the cathode through the electrolyte membrane. For such fuel cells, fuels are most commonly $H_2$ and MeOH.

It can, therefore, be appreciated how the electrolyte membrane is a key to fuel cell performance. First, high fuel cell efficiency requires low internal resistance, and therefore, electrolyte membranes with high ionic conductivity (low ionic resistance) are preferred. Second, high power requires high fuel cell currents, and therefore, electrolyte membranes with high ion-current carrying capacity are preferred. Also, practical electrolyte membranes should resist chemical degradation and be mechanically stable in the fuel cell environment, and also should be readily manufactured.

Polymers of the Invention

This invention provides polymers/ionomers linked with basic functional groups, preferably highly basic groups that are generically described by Scheme 1.

Scheme 1

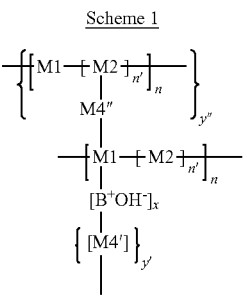

These polymers include repeating monomer unit, M1, with linked basic functional group, $B^+$. Preferably, the monomer unit polymerizes to form an aromatic polymer (e.g., by containing aromatic functionality) that is selected from one of polysulfone (PSf), polystyrene (PSt), poly(ether sulfone) (PES), poly(phenolphthalein ether sulfone) (PESC), poly(ether ketone) (PEK), poly(ether ketone)-cardo (PEKC), poly(ether ether ketone) (PEEK), poly(ether ether ketone ketone) (PEEKK), poly(phthazinone, ether sulfone ketone) (PPESK), polyetherimide (PEI), Poly(phenylene oxide) (PPO), and so forth.

Where n is defined as the number of repeat units containing M1 and (multiple) M2 sections and can be between 10-10,000 (more preferably between 50-2000); n' is defined as the number of repeat units of M2 and can be between 0-100 (more preferably between 0-3); y'' illustrates a polymer chain (i.e. top chain) that is crosslinked to the main chain (i.e. middle chain shown above in Scheme 1) via M1 or M2 without involving the B+ basic group. y' illustrates the group of the bridge for crosslinking via the $B^+$ basic group. Examples of crosslinking via the y' route are further illustrated in Scheme 5 (Self-crosslinking) and Scheme 6. Although multiple chain (y'') or group (y') can be present in Scheme 1, only one chain (y'') or group (y') has been illustrated in Scheme 1, because polymer structures after crosslinking are complex and difficult to draw. Thus, Scheme 1 is only for illustration and should not be viewed as limitations of our current invention. It should be further understood that based on illustrative Scheme 5 and 6, researchers skilled in the art can easily visualize cross linking methods and arrive at crosslinked polymer structures that may seem different from what is illustrated in Scheme 1, but in fact all covered in this invention. M4'' and M4' as shown in Scheme 1 is described below.

Advantageously, the polymer can be a copolymer as known in the art, for example a copolymer of M1 and a second monomer, M2, such as —(O)R—, —(O)Ar—, —CO(O)—, —SO(O)—, and so forth, as well as combinations of different monomers. Alternatively, M1 can be poly(vinylbenzyl chloride) (PVBC) in which case the M2 moiety is not necessary.

In another embodiment, a third single or repeating monomer (can be between 0-100 (more preferably between 0-3)) could be attached alongside M2 (which is linked to M1) according to Scheme 1 above. This version has not been illustrated. In yet another embodiment, other not shown single or repeating monomers (can be between 0-100 (more preferably between 0-3)) could be linked to this third monomer, and so forth. These third or fourth etc. monomers can be, but not limited to, —(O)R—, —(O)Ar—, —CO(O)—, —50(O)—, and so forth. M2, and the possible third, fourth and subsequent monomers can be all independently selected from the aforementioned groups; and furthermore, these third, fourth and subsequent monomers can be present on both the polymer chain (i.e. [M1-[M2]n']n) that is crosslinked to the main chain or on the main chain itself.

The mol ratio of the basic group to the M1, x, is an adjustable parameter selected to give suitable properties in a particular application. Possible ratios depend on the chemistry of the attachment of $B^+$ to M1 as exemplified subsequently. Among possible ratios, a higher ratio is preferable as it leads to a higher ion exchange capacity (IEC), and a higher IEC is expected to lead to a higher ion-carrying capacity. However, a higher ratio can also lead to undesirable physical properties, such as excessive water absorption, swelling, and loss of mechanical stability. Generally, preferred ratios are between one-half and two, $0.5 \leq x \leq 2$. A particular possible ratio can be selected within this range by routine experimentation as described subsequently. The illustrated $OH^-$ group is the preferred anion for maintaining charge neutrality.

Also advantageously, the polymer can be cross-linked in order to improve mechanical stability, e.g., resistance to swelling in an aqueous or an organic solvent environment. Preferably, the degree of cross-linking is that which ensures minimum required mechanical stability, as excessive cross-linking can restrict the ionic conductivity of the subsequent membrane. This invention can take advantage of many cross-linking techniques known in the art; Scheme 1 illustrates two exemplary techniques. In one exemplary embodiment illustrated by group y'', the polymer chains themselves are cross-linked by a linker M4'', which can be a functional group of M1 (M2) (or of the third monomer, fourth monomer etc.) or provided in a separate cross-linking reaction. In a preferred exemplary embodiment illustrated by group y', polymer chains are cross-linked through functional group B+ by means of linker M4'.

Preferably in a "self-cross-linked" (SCL) embodiment, M4' is another copy of linker M3 attached to an adjacent polymer chain. In a multi-halogenated hydrocarbon embodiment, M4' is a separate linker such as di- and tri-halogenated lower alkanes and alkenes and halogenated polymers for example, where the preferred halogen is chlorine. Examples include 1,2-dichloroethane, 1,2-dichloroethylene, 1,2-dichloropropane, 1,3-dichloropropane, 1,2,3-trichloropropane, 1,3-dichloropropene, and similar, and PVBC and polyvinyl chloride (PVC), polyvinyl benzyl chloride (PVBC), and similar. Both embodiments of cross-linking are readily prepared since the three aromatic C(H)s on the TTMOPP have been found to be active nucleophiles.

In most preferred embodiments, M1 is polysulfone containing —OPhC(CH$_3$)$_2$Ph and —OPhSO(0)Ph repeat units and cross-linking, if present, is of the SCL type. This polymer is referred to herein simply as "polysulfone" (PSf).

The basic functional group is one of the important aspects of this invention. It is believed that, when formed into a membrane, the basic groups form a hospitable environment for OH$^-$ ions facilitating their transfer through the membrane. Corresponding, positive ions are relatively blocked by this environment. Basic groups useful in this invention have a pK$_b$ (in the environment of the particular polymer) of between −2.0-2.0. Highly preferred basic groups have a pK$_b$ of −2 or smaller. Specifically, preferred basic groups are generically described by Scheme 2, with more basic groups being more preferred.

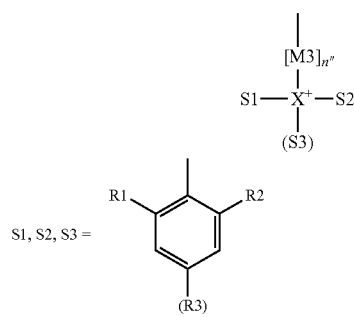

Scheme 2

Generally, "( . . . )" denotes the enclosed group is optional. Here, M3 is a bridge chain between X$^+$ and the polymer backbone, which can be, for example, a short chain alkyl or halogenated alkyl or an aromatic or a substituted aromatic. Specifically, M3 can be —(CH 2)$_n$—, —(CR$_2$)$_n$—, —Ar—, or -substituted Ar—, where n is preferably 1, 2, or 3 and Y is a halogen (F, Cl, Br, I); and the n" is defined as the number of repeat units of M3.

Both X and the substituents S1, S2, and (optionally) S3 (as shown in Scheme 2 above as (S3)) are the key to the basicity of B$^+$OH$^-$, and are advantageously chosen to have a pK$_b$ (in the environment of the particular polymer) of between −2.0-2.0 or close to this range, or highly preferably chosen to have a pK$_b$ of −2 or smaller. Specifically, preferred basic groups are generically described by Scheme 2, with more basic groups being more preferred.

Specifically, X is preferably selected from the elements of P, As, Sb, 5, Se, Te, and similar, with P, As, and Sb being preferred and P being more preferred (at least because of its lower toxicity). X is preferably not the element of N. The substituents S1, S2, and (for the X=P, As or Sb) S3 can be the same or different but all should be electron donating, preferably strongly electron donating, as known in the art. Generally, preferred substituents have an unshared electron pair adjacent to X, such as —OR, —OH, —NH$_2$, —NHR, —NR$_2$, —NHCOR, —OCOR, —SR, —SH, —R, —Br, or —I where R is a short chain alkyl or allyl (i.e., have approximately six or less C) or a phenyl such as —CH$_3$, —(CH$_2$), —CH$_3$, -Ph with n=0, 1, 2. —R, —Br, or —I are less preferred. Preferred substituents can also have an unshared electron pair connected to an unsaturated system adjacent to X, such as —Ar or substituted —Ar where the substituents on Ar are also electron donating. In more preferred embodiments, S1, S2, and S3 can have the form illustrated at the left of Scheme 2. R1, R2, and (optionally) R3 (as shown in Scheme 2 above as (R3)) can also be the same or different but all should also be electron donating, preferably strongly electron donating, such as one or more of the electron-donating groups already listed.

The importance of the S1, S2, and S3 substituents are illustrated by Table 1 (see above), which lists the key properties of hydroxide ion conductivity and stability for standard electrolyte membranes from polymers having the indicated structures. (In this table and subsequently, DC=degree of chloromethylation, which, in the case of preferred polymers and as discussed subsequently, controls the mol ratio x of B$^+$ to M1 (and M2) discussed previously.

Here, -Bu is weakly electron donating; -Ph is only slightly more electron donating; while tris(2,4,6-trimethoxyphenyl) phosphine (2,4,6-MeO$_3$Ph) is strongly electron donating. Owing to the extremely high basicity (pK$_b$: 2.8) and large molecular size, tris(2,4,6-trimethoxyphenyl) phosphine (TTMOPP) as the tertiary phosphine ligand provides the TPQPOH extremely high ionic conductivity and excellent alkaline and temperature stability.

In most preferred embodiments, B$^+$ is -(2,4,6-MeO$_3$Ph)$_3$P$^+$ and the polymer is PSf (polysulfone), either not cross-linked or SCL. Specifically, the preferred polymer is (tris(2,4,6-trimethoxyphenyl)phosphine)$_x$ based quaternary phosphonium polysulfone hydroxide (referred to in the following as TPQPOH-x or as TPQPOH-x*100%), a quaternary phosphonium where x is the mol ratio of the quaternary phosphonium groups to the polysulfone monomers. Preferably, 0.5<x<2.

The subsequent sections describe the synthesis and properties of this embodiment.

EXAMPLES

1. Synthesis of TPQPOH-x and SCL-TPQPOH-x

The three aromatic C(H)s on Tris(2,4,6-trimethoxyphenyl) phosphine (TTMOPP) have been found to be highly nucleophilic, and therefore, can readily react and be covalently linked with electrophiles such chloromethylated groups (CM). TTMOPP can, thus, readily link to polymers containing internal CM groups, and depending on stoichometry, such polymers can also readily cross-link through the TTMOPP group.

Accordingly, TPQPOH-x has been synthesized by first chloromethylating polysulfone (PSf) to form the intermediate chloromethylated polysulfone (CMPSf), and second, adding TTMOPP to CMPSf. The addition can be controlled since the mol ratio of CM groups to PSf monomers in TPQPOH-x can be determined by $^1$HNMR.

1.1Synthesis of Chloromethylated Polysulfone (CMPSf): CMPSf was synthesized by chloromethylating polysulfone (PSf) (Sigma-Aldrich, Co. #182443, 374296, 428302) with paraformaldehyde and trimethylchlorosilane as chloromethylating agent and stannic chloride as catalyst, according to Scheme 3. See, e.g., E. Avram, E. Butuc, C. Luca, I. Druta, Journal of Macromolecular Science-Pure and Applied Chemistry A34, 1701 (1997).

Scheme 3. Synthesis of Chloromethylated polysulfone (CMPSf)

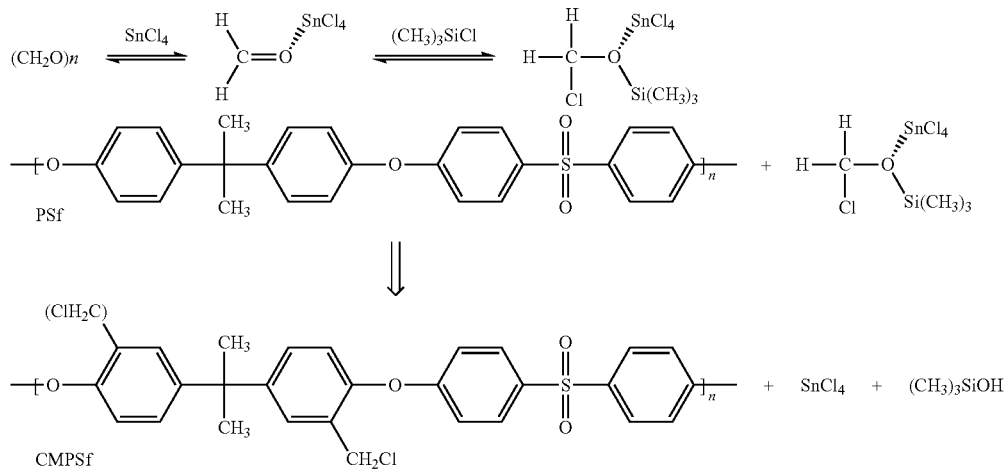

Paraformaldehyde and trimethylchlorosilane (10 mol mol$^{-1}$ ratio to PSf for both) were added into PSf solution (2 g L$^{-1}$ in chloroform) in a flask equipped with a reflux condenser and magnetic stirring, followed by drop wise addition of stannic chloride (0.2 mol mol$^{-1}$ ratio to PSf). The reaction was kept at 50° C. using an oil bath for reaction times between 1 h. and 120 h. CMPSf with 1-200% of degree of chloromethylation (DC) was synthesized depending on the reaction time.

Separation and purification of CMPSf was carried out by a precipitation method. The reaction mixture was poured into ethanol (95%) to end the reaction. White CMPSf immediately precipitated. The product was recovered by filtration from the ethanol, washed well with ethanol, and dried in vacuum at room temperature for 12 h.

1.2 $^1$HNMR spectroscopy and determination of degree of chloromethylation (DC) of CMPSf: The $^1$HNMR spectra were recorded on a Varian Inova 500 spectrometer at a resonance frequency of 500.059 MHz. Dilute CMPSf solutions were prepared in deuterated chloroform (CDCl$_3$) with tetramethylsilane (TMS) as the internal standard. The DC of CMPSf was calculated using the following equation:

$$DC = \frac{2A_{He}}{A_{Hd}} \times 100\%,$$

where, $A_{He}$ and $A_{Hd}$ are the integrated areas of the He (the protons in —CH$_2$Cl) and the Hd (the protons in the aromatic ring adjacent to the —SO$_2$— group) in the $^1$HNMR spectrum. CMPSf with DC of x % is denoted as CMPSf x %. See, e.g., V. Cozan and E. Avram, European Polymer Journal 39 (1), 107 (2003).

1.3 Synthesis of tris(2,4,6-trimethoxyphenyl)phosphine Based Quaternary phosphonium polysulfone hydroxide (TPQPOH): Tris(2,4,6-trimethoxyphenyl) phosphine based quaternary phosphonium polysulfone chloride (TPQPCl) was synthesized by quaternary phosphorization of CMPSf with TTMOPP according to Scheme 4. CMPSf was dissolved in N,N-dimethylformamide (DMF) at 10 wt. %, followed by addition of TTMOPP (Sigma-Aldrich, Co. #392081) at a mol ratio of TTMOPP to the chloromethylated groups in CMPSf of approximately one (or from 95%, 97% or 99% to 105%, 110% or 120%). The quaternary phosphorization reaction was held at 80° C. for 12 h; the reaction mixture was poured into a Petri dish; and the DMF was evaporated at 40° C. for 2 d to obtain TPQPCl. TPQPOH was obtained by treating TPQPCl in 1M KOH at room temperature for 48 h, followed by thorough washing and immersion in DI (deionized) water for 48 h to remove residual KOH.

If the reaction is allowed to go to substantial completion, the number of phosphonium groups bound to each polysulfone monomer is approximately equal to the DC of the CMPSf.

Scheme 4. Synthesis of TPQPOH

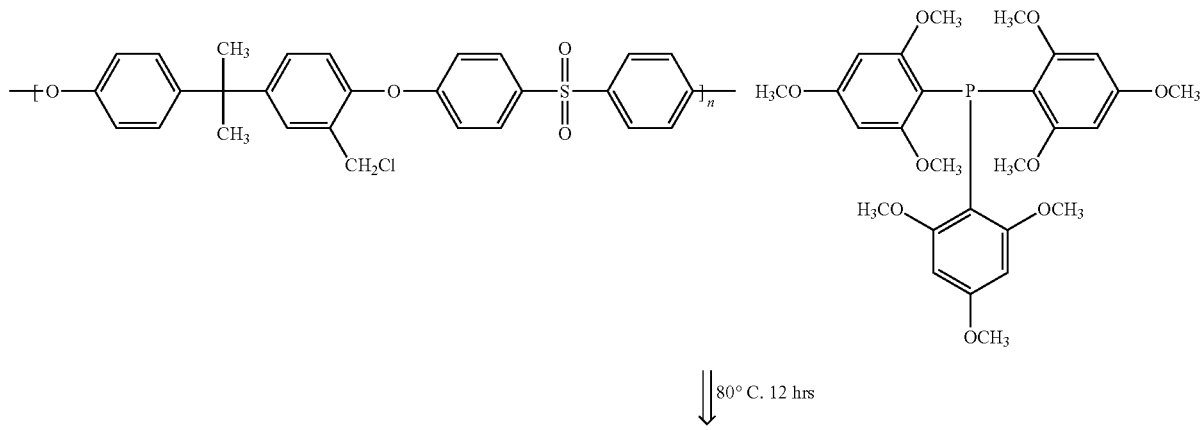

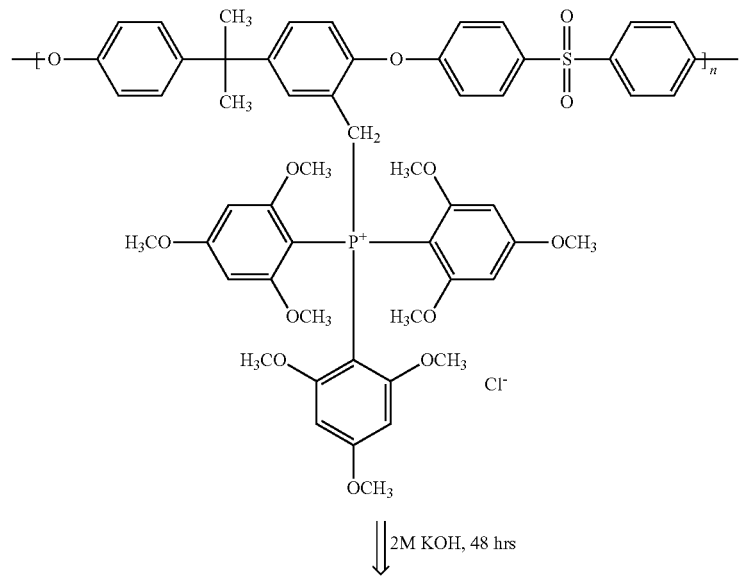

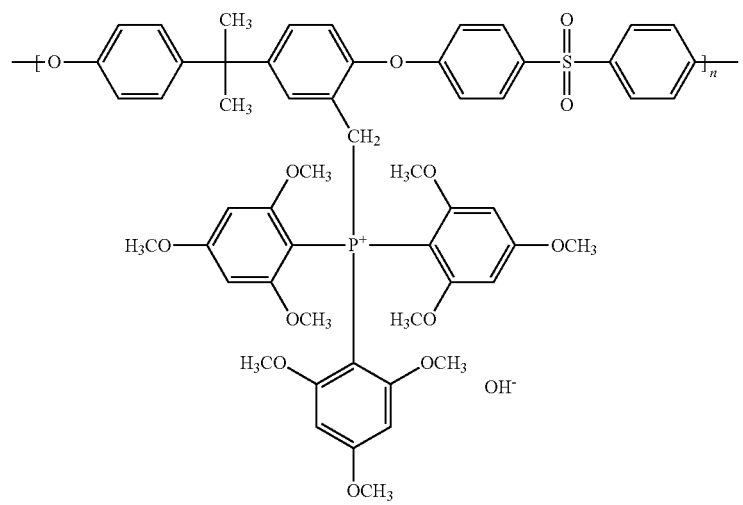

1.4 Preparation of self-cross Linked TPQPOH(SCL-TPQPOH): Self-cross linked Tris(2,4,6-trimethoxyphenyl) phosphine based quaternary phosphonium polysulfone chloride (SCL-TPQPCl) was synthesized by quaternary phosphorization of CMPSf with TTMOPP exactly as for unlinked TPQPOH except that the mol ratio of TTMOPP to the chloromethylated groups in CMPSf was varied in the range from 60% (or 40% or 50%) to 95% (or 96% or 98%). As is understood from the art, lower more ratios leads to a greater degree of cross-linking as then each TTMOPP group is likely to become linked by more than one to the chloromethylated group from different polymer chains. At higher mol ratios, the degree of cross-linking is less as then each chloromethylated group is likely to become linked to at most one TTMOPP moiety.

If the reaction is allowed to go to substantial completion, the number of phosphonium groups bound to each polysulfone monomer is approximately equal to the DC of the CMPSf but a certain number of TTMOPP groups are expected to be bound to at least two separate ionomer chains thereby cross-linking the two ionomer chains. This average number of doubly-linked TTMOPP groups is expected to be on average approximately the mol ratio of the chloromethylated groups in CMPSf to TTMOPP minus one (but not less than 0). Accordingly, the latter number, the mol ratio of the chloromethylated groups in CMPSf to TTMOPP minus one (but not less than 0) is referred to herein as the degree of self-cross linking (DSCL).

The self-cross linking embodiment is shown in Scheme 5.

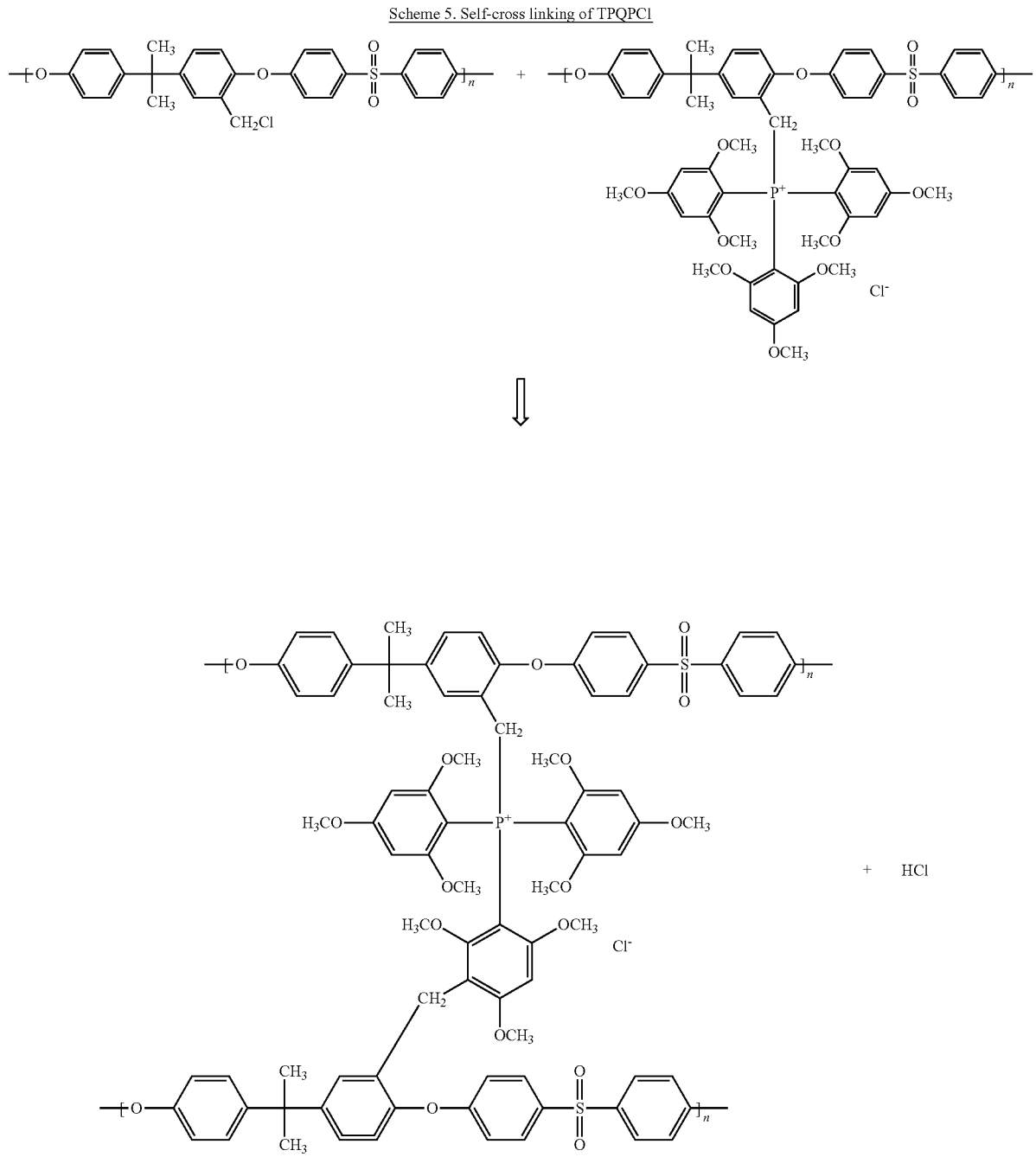

1.5 Preparation of multi-halogenated cross-linked TPQPOH:

Multi-halogenated cross-linked TPQPOH has been prepared by reacting TPQPOH with 1,3-dichloropropane. Multi-halogenated cross-linked PVC-TTMOPP and PVBC-TTMOPP have been similarly prepared. A di-chloromethylated hydrocarbon cross-linking, as an embodiment is shown in Scheme 6. The halogenated alkyl/phenyl group (here, chloromethylated methylene) can covalently link to the TTMOPP from different polymer chains by the condensation we mentioned before, forming the multi-halogenated cross-linked polymers.

Scheme 6. Multi-halogenated (here, di-chloromethylated) hydrocarbon cross linking of TPQPCl
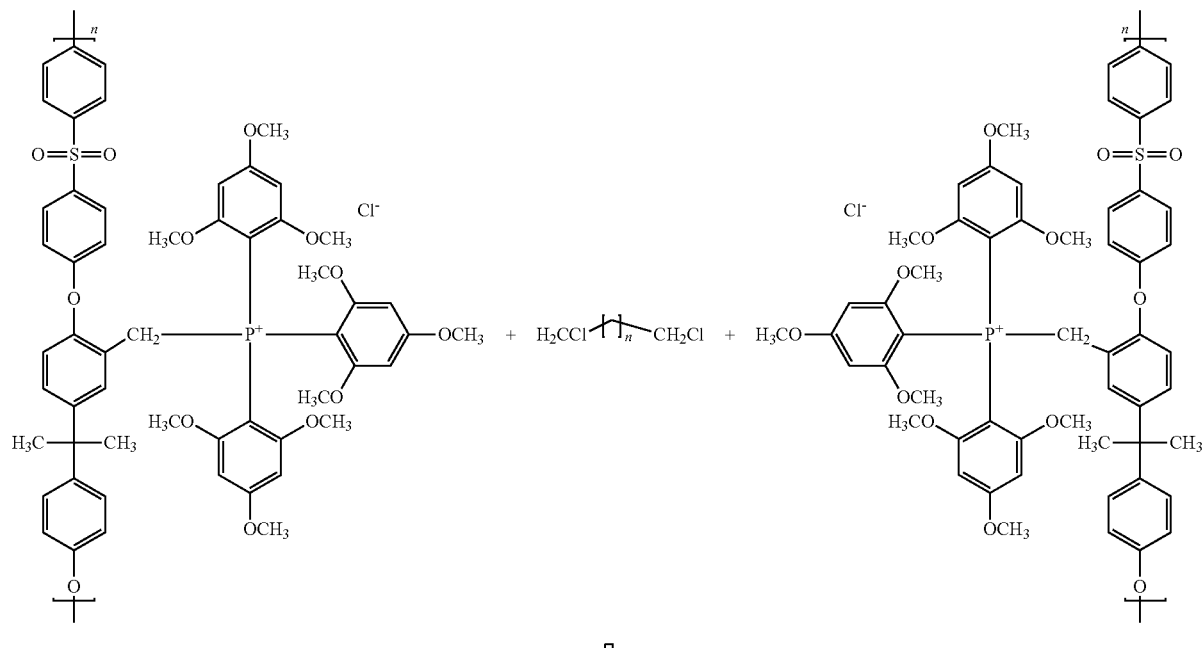
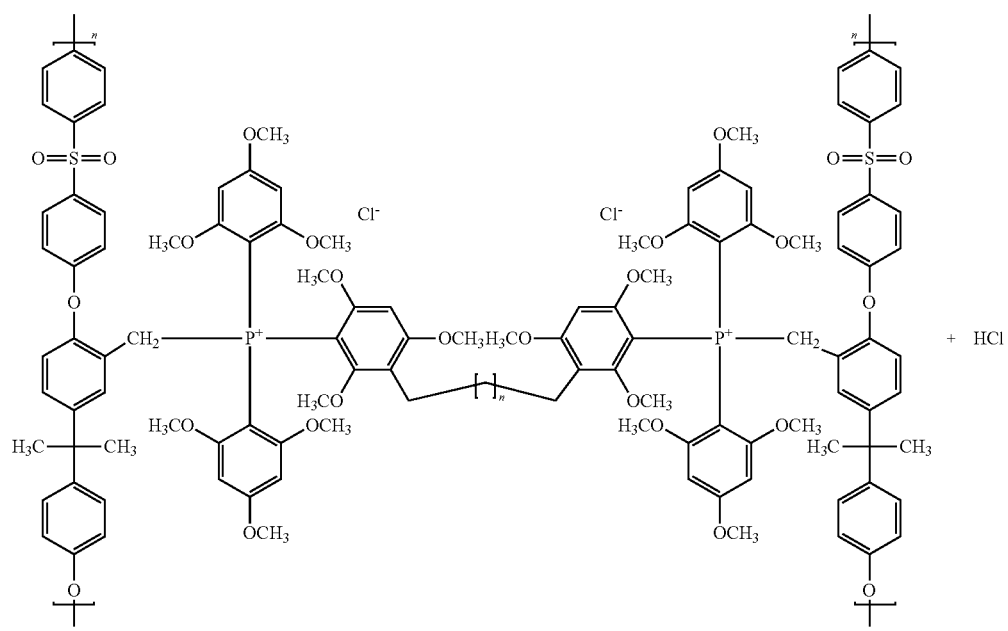

2. Testing of TPQPOH and SCL-TPQPOH Membranes

This section first presents experimental data that have been measured for TPQPOH and for membranes of TPQPOH. It then further presents experimental data for fuel cells with TPQPOH membranes.

2.1 Properties of TPQPOH and of TPQPOH Membranes 2.1.1 Solubility of TPQPOH: Table 2 shows the solubility of TPQPOH in low-boiling-point water-soluble solvents at room temperature.

TABLE 2

| Solubility of TPQPOH[a] | | | |
|---|---|---|---|
| Aqueous soluble solvent | Boiling point/ °C. | 50 vol. % in Water | Pristine solvent |
| $H_2O$ | 100 | N/A | —[b] |
| MeOH | 64.7 | + | + |
| EtOH | 78.3 | + | + |
| PrOH | 97.2 | + | + |
| Acetone | 58.1 | +− | + |
| THF | 66.0 | + | − |
| Ethyl acetate | 77.1 | − | − |

[a]DC of CMPSf: 124%
[b]80° C.
+: Soluble;
−: Insoluble;
+−: Partially soluble

It is apparent that TPQPOH is insoluble in water, even at 80° C., which permits its use in electrodes for water-based fuel cells without soluble loss.

Further, since low-boiling-point water-soluble solvents, e.g. EtOH and PrOH, are used for catalyst ink in fuel cell electrode preparation of electrode, due to the safety and efficiency, the solubility of ionomer in such solvents is an important requirement. It is also apparent that TPQPOH exhibits excellent solubility in MeOH, EtOH and PrOH in both 50 vol. % in water and pristine solvent at room temperature, which makes TPQPOH a useful soluble ionomer for fuel cell electrode preparation.

2.1.2 Preparation of TPQPOH membranes: TPQPOH membranes for the tests described herein were prepared by, first, preparing TPQPCl membranes by casting TPQPCl in DMF on a glass plate and then curing and drying at 40° C. for 1-2 days. TPQPCl membranes (thickness: 100-150 μm) were obtained by peeling off on the glass plate in deionized (DI) water. Then, TPQPOH membranes were prepared by treating TPQPCl membranes in 1M KOH at room temperature for 48 h, followed by thorough washing and immersion in DI water for 48 h to remove residual KOH.

2.1.3 Preparation of membrane electrode assembly (MEA) with commercial anion exchange polymers: Commercial anion exchange membranes were also tested in the study, for example FT-FAA (Fuma-Tech GmbH). FT-FAA membrane had the following characteristics: thickness of 70 μm; ionic conductivity of 17 mS cm$^{-1}$ (millisiemens) in DI water at 20° C.; and ion exchange capacity of 1.6 mmol g$^{-1}$. Membrane electrode assemblies (MEA) with 5 cm$^2$ active area were prepared by pressing the anode, FAA commercial anion exchange membrane (OH$^-$ form) and cathode at 60° C. under 120 kgf/cm$^2$ for 5 min.

The MEA was assembled in a single cell fixture for the HEMFC test. After activation, the cell was discharged at constant current density from 0 to maximum current density in steps of 20 mA cm$^{-2}$ every 5 min. The I—V polarization curves were obtained under the operation conditions: pure $H_2$ and $O_2$ as fuel and oxidant, 0.2 L min$^{-1}$ and 250 kPa of flow rate and back pressure for both $H_2$ and $O_2$, the temperatures of anode and cathode humidifiers are 70° C. and 80° C., respectively, the cell temperature was kept at 50-80° C. accordingly.

2.1.4 Measurement methods for Ionic conductivity of TPQPOH membranes: Ionic conductivity in the longitudinal direction was measured by a four-electrode method using AC impedance spectroscopy under water immersion. A conductivity cell was made from two platinum foils carrying the current and two platinum wires sensing the potential drop. The impedance measurements were carried out using an impedance/phase gain analyzer (Solartron SI 1260) and a potentiostat (Solartron SI 1287) over the frequency range from 1 Hz to 100 kHz. All the membrane samples were thoroughly washed and immersed in DI water for at least 12 h before testing. The conductivity of the membrane was calculated using the equation:

$$\sigma = \frac{L}{WdR},$$

where σ is ionic conductivity, L is distance between the two reference electrodes, W and d are width and thickness of membrane sample, respectively, and R is resistance of the membrane derived from the right-side intersect of semi-circle on the complex impedance plane with the Re(Z) axis.

2.1.5 Measurement methods for water uptake and swelling ratio of TPQPOH membranes: Membrane samples were immersed in deionized water at different temperatures for 48 h to insure the membranes were saturated with water. The liquid water on the surface of wet membranes was removed quickly with filter paper, and then the weight and dimensional lengths of wet membranes were measured. The weights and lengths of dry membranes were obtained after the wet membranes were dried for 48 h at 40° C. The water uptake and swelling ratio were calculated by the following equations:

$$\text{Water uptake} = \frac{W_{wet} - W_{dry}}{W_{dry}} \times 100\%,$$

$$\text{Swelling ratio} = \frac{I_{wet} - I_{dry}}{I_{dry}} \times 100\%,$$

where $W_{wet}$ and $W_{dry}$ are the weights of wet and dry membrane samples respectively; $I_{wet}$ and $I_{dry}$ are the average length ($I_{wet}=(I_{wet1} \times I_{wet2})$, $I_{dry}=(I_{dry1} \times I_{dry2})^{1/2}$) of wet and dry samples, respectively, and where, $I_{wet1}$, $I_{wet2}$, and $I_{dry1}$, $I_{dry2}$ are the lengths and widths of wet membranes and dry membranes, respectively.

2.1.6 Water uptake and swelling ratio of TPQPOH membranes:

Dimension stability of anion exchange membrane is important for practical use. Table 3 shows water uptake and swelling ratio of TPQPOH membranes with various DCs in DI water at 20° C. and 60° C.

TABLE 3

Water uptake and swelling ratio of TPQPOH membranes

| DC/% | Water uptake/% | | Swelling ratio/% | |
|---|---|---|---|---|
| | 20° C. | 60° C. | 20° C. | 60° C. |
| TPQPOH 75 | 25 | 35 | 9 | 14 |
| TPQPOH 99 | 41 | 71 | 12 | 20 |
| TPQPOH 124 | 70 | 145 | 21 | 34 |
| TPQPOH 152 | 137 | 255 | 33 | 48 |
| TPQPOH 178 | 798 | 2429 | 74 | 157 |

As expected, water uptake and swelling ratio increase with temperature and DC. TPQPOH 124 membrane has 70% and 145% water uptake at 20° C. and 60° C., respectively, indicating good water absorption. At the same time, its swelling ratios are 21% and 34% at 20° C. and 60° C., respectively, indicating good dimension stability. Since TPQPOH 124 also has good ionic conductivity, as described subsequently TPQPOH 124 is a preferred material for hydroxide exchange membranes. Water uptake (swelling ratio) at 60° C. can be selected to be any value between about 35% (about 14%) and about 2429% (about 157%) by choosing a DC between about 75 and about 178.

However, TPQPOH 178 has an excessive water uptake and swelling ratio, i.e., making the membrane's mechanical strength unacceptable.

2.1.7 Alkaline, temperature and time stability of TPQPOH membrane:

Since the internal environment of HEMC fuel cells is alkaline, the alkaline stability of an ionomer and of the anion exchange membranes containing the ionomers are of practical importance. Table 4 shows alkaline stability of TPQPOH in different concentrations of KOH.

TABLE 4

Alkaline stability of TPQPOH 124 membrane after immersion at room temperature for 48 hrs

| Concentration of KOH/ mol L$^{-1}$ | Color and morphology | Ionic conductivity/mS Cm$^{-1}$ |
|---|---|---|
| 1 | Slightly gold yellow, flexible | 27 |
| 2 | Slightly gold yellow, flexible | 26 |
| 5 | Slightly gold yellow, flexible | 29 |
| 10 | Slightly gold yellow, flexible | 32 |
| 15 | Yellow, brittle | Can't measure |
| 19.6 (saturated) | Deep yellow, very brittle | Can't measure |

It is apparent that TPQPOH doesn't lose ionic conductivity, even after being immersed in 10 M KOH solution (half saturated) at room temperature for 48 h, indicating excellent alkaline stability. Only KOH solution at 15 M and higher could turn TPQPOH a deep color and make TPQPOH membranes brittle.

Also, since elevated temperature can considerably improve fuel cell performance, temperature stability is also of practical importance. Table 5 shows temperature stability of TPQPOH-124 membrane.

TABLE 5

Temperature stability of TPQPOH 124 membrane after immersion of 48 hrs

| Temperature/° C. | Ionic conductivity/mS cm$^{-1}$ | |
|---|---|---|
| | DI water | 1M KOH |
| 20 | 27 | 27 |
| 60 | 26 | 27 |

It is apparent that TPQPOH doesn't lose ionic conductivity after being immersed in both DI water and even 1 M KOH at 60° C. for 48 h. Considering the highest usage temperature of current commercial anion exchange membrane is no more than 50-60° C., temperature stability of TPQPOH is excellent as both an ionomer and an anion exchange membrane.

The working life of an ionomer and anion exchange membrane depends on its time stability.

TABLE 6

Time stability of TPQPOH 124 membrane

| Time/d | Ionic conductivity/mS cm$^{-1}$ | |
|---|---|---|
| | DI water | 1M KOH |
| 0 | 27 | 27 |
| 30 | 27 | 28 |

From Table 6, it is also apparent that the ionic conductivity of TPQPOH-124 doesn't decrease after being immersed in DI water or 1 M KOH for 30 days, indicating excellent time stability.

2.1.8 Ionic conductivity of TPQPOH membrane compared to other membranes: High hydroxide-conductivity is one of the most important requirements of an HEM (hydroxide exchange membrane). Table 7 shows hydroxide conductivity of TPQPOH at room temperature.

TABLE 7

Ionic conductivity of TPQPOH membranes

| Sample | Ionic conductivity/mS cm$^{-1}$ |
|---|---|
| TPQPOH 75% | 8 |
| TPQPOH 99% | 11 |
| TPQPOH 124% | 27 |
| TPQPOH 152% | 45 |
| TPQPOH 178% | 38 |
| FAA | 17 |
| Nafion112 | 84 |

It is apparent in Table 7 that TPQPOH exhibits excellent hydroxide conductivity. As expected, ionic conductivity of TPQPOH increases remarkably with DC of CMPSf (although mechanical stability decreases concurrently). Hydroxide ionic conductivity of TPQPOH can be selected to be any value between about 8 mS/cm and about 45 mS/cm by choosing a DC between about 75 and about 75%-178%.

In particular, TPQPOH152 exhibits the highest hydroxide-conductivity of among all currently known HEMs. Currently commercially available HEMs or HEMs reported by academic or industry labs are based on ionomers quaternary amines (QAOH) containing functional groups. Scheme 7 shows an exemplary QAOH functional group along with the quaternary phosphonium (QPOH) functional group of this invention.

Scheme 7. Chemical structures of an exemplary QAOH functional group and the QPOH functional group of this invention

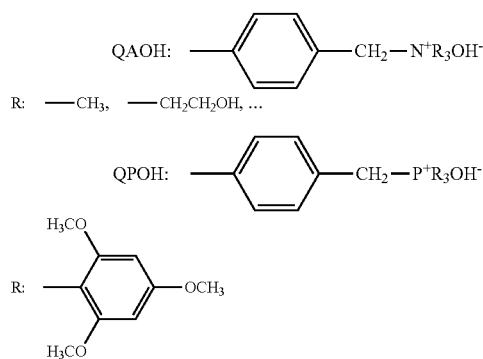

TPQPOH152 exhibits the highest hydroxide-conductivity of 45 mS cm$^{-1}$ (20° C.) among all known HEMs.

Figure 4:
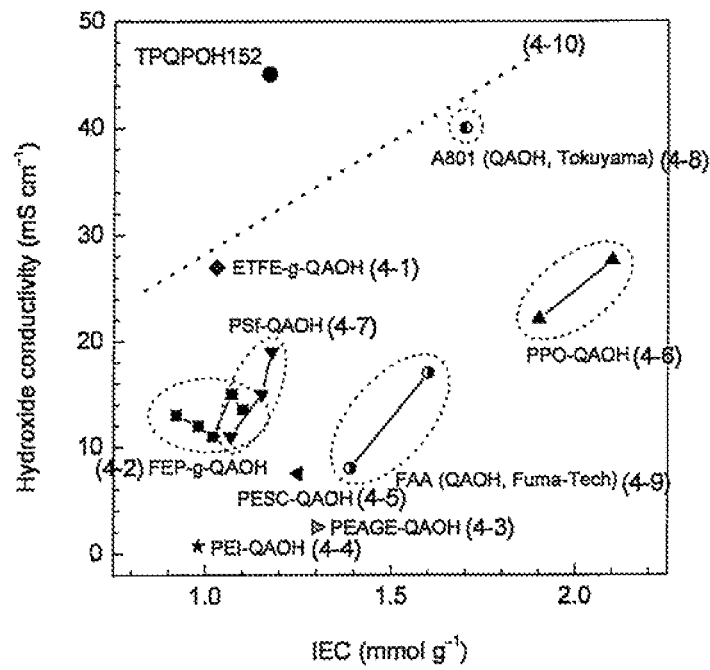
FIG. 4 illustrates hydroxide-conductivity vs. IEC at ~20° C. for the following QAOH functionalized polymers immersed in deionized water.

FIG. 4 illustrates the hydroxide conductivity of several all current QAOH functionalized HEMs available commercially or reported by academic or industry labs plotted against their ion exchange capacity (IEC) (FIG. 4). Commonly higher conductivity is found at higher IEC, and this relationship is represented in FIG. 4 by line 4-10, which slopes upward toward increasing conductivities as the IEC increases.

It can be seen that all known QAOH functionalized HEMs are located below line 4-10, while only the QPOH functionalized TPQPOH152 of this invention, as a surprising exception, is above the line. In other words, TPQPOH152 has high conductivity at an IEC at which QAOH functionalized HEMs have only much lower conductivities. To achieve conductivities closer to, but still less than, TPQPOH152, QAOH functionalized HEMs require significantly higher IECs which usually compromises mechanical stability membranes (e.g., by causing excessive solvent swelling).

More specifically TPQPOH152 has OH$^-$ conductivity 2.6 times that of commercial QAOH functionalized FAA (17 mS cm$^{-1}$, Fuma-Tech GmbH). It also has significantly higher conductivity than those QAOH functionalized HEMs (0.031-40 mS cm$^{-1}$) currently in the research sample stage. See, e.g., L. Li and Y. X. Wang, Journal of Membrane Science 262 (1-2), 1 (2005); R. C. T. Slade and J. R. Varcoe, Solid State Ionics 176 (5-6), 585 (2005); D. Stoica, L. Ogier, L. Akrour et al., Electrochim Acta 53 (4), 1596 (2007); J. R. Varcoe, R. C. T. Slade, E. L. H. Yee et al., Chem Mater 19 (10), 2686 (2007); S. F. Lu, J. Pan, A. B. Huang et al., P Natl Acad Sci Usa 105 (52), 20611 (2008); L. Wu, T. W. Xu, D. Wu et al., J Membrane Sci 310 (1-2), 577 (2008); G. G. Wang, Y. M. Weng, D. Chu et al., J Membrane Sci 326 (1), 4 (2009); J. Fang and P. K. Shen, J Membrane Sci 285 (1-2), 317 (2006); H. W. Zhang and Z. T. Zhou, J Appl Polym Sci 110 (3), 1756 (2008); Y. Xiong, J. Fang, Q. H. Zeng et al., J Membrane Sci 311 (1-2), 319 (2008); J. S. Park, S. H. Park, S. D. Yim et al., J Power Sources 178 (2), 620 (2008); Hiroyuki. Yanagi and Kenji Fukuta, ECS Trans 16 (2), 257 (2008).

It also important to note that at similar IECs (1.17 mmol g$^{-1}$ for TPQPOH152 and 1.179 mmol g$^{-1}$ for PSf-QAOH) and with the same polymer matrix of polysulfone and similar homogeneous membrane structure, TPQPOH has a conductivity ca. 2.4 times of that (19 mS cm$^{-1}$) of PSf functionalized with QAOH, PSf-QAOH at 4-7. This difference is due to the substantially higher basicity of the QPOH functional group in TPQPOH152 in comparison to the QAOH function group in QAOH functionalized HEMs. Further the substantially higher basicity is believed to be due to the 2,4,6-trimethoxyphenyl groups in the QPOH which are very strong electron-donors in comparison to the methyl group, a weak electron donor, typically found in QAOH function groups. This higher basicity of TPQPOH152 is also consistent with its better alkaline stability, because the efficient decentralization of positive charge of phosphorus atom by the electron-donating triple 2,4,6-trimethoxyphenyl groups, enhances substantially and simultaneously the stability and basicity.

Interestingly, the ratio of hydroxide conductivity of TPQPOH152 to the proton conductivity of Nafion112 (84 mS cm$^{-1}$) is 0.54:1, which is close to 0.57:1 that is the ratio of the ion-mobility of the hydroxide to the proton (20.50 vs. 36.25 cm$^2$ V$^{-1}$ s$^{-1}$, 25° C.)). This implies that the hydroxide transport network likely to be created within TPQPOH152 is similarly efficient to the proton network within Nafion. See, e.g., D. Eisenberg and D. Crothers, Physical Chemistry with Applications to the Life Sciences, 1st ed. (Benjamin/Cummings Publishing Co., Menlo Park, Calif., 1979); T. D. Gierke, G. E. Munn, and F. C. Wilson, J Polym Sci Pol Phys 19 (11), 1687 (1981).

2.2 Properties of Fuel Cells With TPQPOH Membranes 2.2.1 Electrode preparation: Catalyst ink was prepared by mixing platinum black powder and TPQPOH ionomer in the presence of ethanol and DI water. Briefly, platinum black was well dispersed in DI water, followed by addition of 5 wt. % TPQPOH in a mixture of ethanol and DI water (50/50 wt./wt.), and then addition of an additional 1.5 g water and an additional 1.5 g anhydrous ethanol. Summarizing, the recipe used was 100 mg Pt; 0.5 g 5 wt. % TPQPOH in 50/50 EtOH/H$_2$O solution (25 mg TPQPOH); 1.5 g additional DI H$_2$O; and 1.5 g additional EtOH. The catalyst ink was kept for good dispersion in an ultra-sonicator at 0° C. for 1 h. Thus the ratio of Pt to TPQPOH was kept at 4/1 wt./wt.

The electrodes (both anode and cathode) were prepared by spraying the catalyst ink onto the commercial gas diffusion layer (GDL), (SGL, 25 cc) for certain Pt loadings, typically 0.2 and 0.5 mg Pt/cm$^2$.

2.2.2 Comparison of HEMFC performance with and without TPQPOH Ionomer in the catalyst layer: FIGS. 2A and 2B illustrate the comparison of HEMFC performance with and without TPQPOH ionomer in the catalyst layer. FIG. 2A illustrates polarization curves with electrode containing the same Pt catalyst loading of 0.2 mg/cm$^2$. TPQPOH adopted HEMFC clearly has a dramatically higher performance, with the maximum current density increasing from 168 to 420 mA/cm$^2$ (a factor of 2.5 increase). The open circuit voltage (OCV) changes little, 1.070 vs. 1.100 V, indicating that the TPQPOH ionomer did not affect the catalytic activity of Pt catalyst.

FIG. 2A inset illustrates the resistance of fuel cells with and without the TPQPOH ionomer. The resistance of TPQPOH adopted HEMFC reduces from 1.05 to 0.50 Ωcm$^2$, which indicates the TPQPOH ionomer can considerably improve the OH$^-$ transfer in the electrodes.

FIG. 2B illustrates the power density with and without the TPQPOH ionomer. The maximum power density increases from 40 to 138 mW/cm$^2$ (a factor of 3.5 increase). To the best of the inventors' knowledge, this is the highest maximum power density among metal cation free HEMFCs.

In summary, the TPQPOH ionomer enhances HEMFC current density and power density and reduces internal resistance.

2.2.3 Performance of TPQPOH adopted HEMFC at elevated temperature: FIGS. 3A-B illustrate HEMFC performance with TPQPOH ionomer in the catalyst layer at elevated temperatures. FIG. 3A illustrates polarization curves demonstrating that TPQPOH adopted HEMFC performance improves with increasing fuel cell temperature. The maximum current density increases from 380 mA/cm$^2$ at 50° C. to 570 mA/cm$^2$ at 80° C. (a factor 50% increase). The OCV of TPQPOH adopted HEMFC decreases slightly from 1.080 V at 50° C. to 1.060 V at 80° C. (largely due to the Nernst law).

FIG. 3A inset illustrates the internal resistance of TPQPOH adopted HEMFCs at elevated temperatures. The resistance of TPQPOH adopted HEMFC decreases from 0.48 Ωcm$^2$ at 50° C. to 0.38 Ωcm$^2$ at 80° C. (decreasing by about 20%). The OH$^-$ conduction of the TPQPOH ionomer in the hydroxide exchange membrane increases considerably with temperature.

FIG. 3B illustrates the power density of TPQPOH adopted HEMFC at elevated temperatures. The maximum power density increases from 141 mW/cm$^2$ at 50° C. to 196 mW/cm$^2$ at 80° C. (increasing by about 40%).

These results clearly indicate that TPQPOH can perform better at higher elevated temperatures, e.g. 80° C.

2.2.4 Comparison of fuel cell performance with TPQPOH membrane compared with other membranes: Although TPQPOH152 HEM has high hydroxide-conductivity and stability, probably due to an efficient hydroxide transport network, the performance of a HEMFC single cell test is the most powerful way to evaluate a novel HEM. FIG. 5 illustrates polarization curves for an H$_2$/O$_2$ HEMFC with a 50 μm TPQPOH152 HEM. It is apparent that the peak power density increases with cell temperature (207, 236 and 258 mW cm$^{-2}$ at 50, 60 and 70° C., respectively), while the measured internal resistance decreases with increasing cell temperature (0.225, 0.214 and 0.210 Ωcm$^2$ at 50, 60 and 70° C., respectively).

FIG. 6 illustrates results with a thicker (100 μm) TPQPOH152 incorporated HEMFC. The peak power densities were 176 and 202 mW cm$^{-2}$ and the internal resistances were 0.334 and 0.299 Ωcm$^2$ at 50 and 60° C., respectively.

Table 8 shows comparable results QAOH functionalized HEMs.

TABLE 8

Performance comparison of QPOH and QAOH functionalized HEMs incorporated HEMFCs

| HEM | Thickness (μm) | Ionomer | Catalyst and (loading, mg cm$^{-2}$) | Oxidant and (back pressure, kPa) | PPD$^a$, mW cm$^{-2}$ and (IR$^b$, Ωcm$^2$) at cell temperature | | |
|---|---|---|---|---|---|---|---|
| | | | | | 50° C. | 60° C. | 70° C. |
| TPQPOH152 | 50 | TPQPOH124 | Pt (0.2) | O$_2$ (250) | 207 (0.225) | 236 (0.214) | 258 (0.210) |
| | 100 | TPQPOH124 | Pt (0.2) | O$_2$ (250) | 176 (0.334) | 202 (0.299) | |
| FAA (QAOH) | 70 | TPQPOH124 | Pt (0.5) | O$_2$ (250) | 141 (0.48) | 157 (0.46) | 178 (0.42) |
| | 70 | None | Pt (0.2) | O$_2$ (250) | 40 (1.05) | | |
| ETFE-g-QAOH | 51 | PVBC-QAOH | PtRu (4.0)/Pt (4.0) | O$_2$ (0) | 130 (0.79) | | |
| | 51 | PVBC-QAOH | Pt (0.5) | O$_2$ (0) | 90 (1.0) | 110 (1.1) | |
| A801 (QAOH) | 17 | AS-4 (QAOH) | Pt (0.5) | Air (N/A) | 95 (N/A) | | |
| | 17 | A3Ver2 (QAOH) | Pt (0.5) | Air (N/A) | 22 (N/A) | | |
| PSf-QAOH | 50 | PSf-QAOH | Ni (5.0)/Ag (1.0) | O$_2$ (130) | | 50 (N/A) | |
| PSf-T/T-QAOH | 90 | PSf-T/T-QAOH | Pt (0.5)/Ag (2.0) | Air (0) | | 30.1 (1.5) | |
| | 90 | PSf-T/T-QAOH | Pt (0.5) | Air (0) | | 28.2 (2.3) | |
| NEOSEPTA (QAOH) | N/A | PSf-T/T-QAOH | Pt (0.5) | Air (0) | | 16.5 (N/A) | |

$^a$PPD, peak power density.
$^b$IR, internal resistance.
See, e.g., J. R. Varcoe and R. C. T. Slade, Electrochemistry Communications 8 (5), 839 (2006); S. F. Lu, J. Pan, A. B. Huang et al., P Natl Acad Sci Usa 105 (52), 20611 (2008); J. S. Park, S. H. Park, S. D. Yim et al., J Power Sources 178 (2), 620 (2008); Hiroyuki. Yanagi and Kenji Fukuta, ECS Trans 16 (2), 257 (2008); S. Gu, R. Cai, T. Luo et al., Angew Chem Int Edit 48 (35), 6499 (2009); Jin-Soo Park, Gu-Gon Park, Seok-Hee Park et al., Macromol Symp 249-250 (1), 174 (2007).

With comparable membrane-thickness and lower catalyst loadings, the peak power density of TPQPOH152 incorporated HEMFC is 1.5-9.4 times that of QAOH functionalized HEM incorporated HEMFC, and its internal resistance is 13%-50% that of the QAOH fuel cells. In addition, the peak power density of 258 mW cm$^{-2}$ and the internal resistance of 0.210 Ωcm$^2$ are the highest and lowest values, respectively, among these HEMFCs.

2.2.5 Comparison of TPQPOH incorporated HEMFC and Nafion incorporated PEMFC: To benchmark HEMFCs against PEMFCs, a 50 μm Nafion212 membrane incorporated PEMFC fuel cell was tested under the conditions comparable to those of FIG. 7. Table 9 shows the comparison results.

TABLE 9

Performance comparison of HEMFC and PEMFC

| Fuel cell | Membrane | OCV (V) | PPD (mW cm$^{-2}$) | IR (Ω cm$^2$) | i$_0{}^a$ (A cm$^{-2}$) | b$^b$ (mV dec$^{-1}$) |
|---|---|---|---|---|---|---|
| HEMFC | TPQPOH152 | 1.015 | 207 | 0.225 | 1.5 × 10$^{-7}$ | 63 |
| PEMFC | Nafion212 | 0.998 | 838 | 0.096 | 1.8 × 10$^{-7}$ | 68 |

Membrane-thickness of 50 μm, cell temperature of 50° C., and catalyst loading of 0.2 mg Pt cm$^{-2}$.
$^a$i$_0$, apparent exchange current density.
$^b$Tafel slope.

The HEMFC has about a quarter of peak power density and 2.3 times of internal resistance of the PEMFC. A higher open circuit voltage, OCV (1.015 vs. 0.998 V), a similar apparent exchange current density, $i_0$ (1.5×10$^{-7}$ vs. 1.8×10$^{-7}$ A cm$^{-2}$), and a lower Tafel slope (63 vs. 68 mV dec$^{-1}$) are also observed for HEMFC.

In the case of exchange current density, the geometric electrode area was used while the true electrochemical Pt surface area, which is known to be higher for the wt. % Pt/C used for PEMFC than the Pt black used for HEMFC. Therefore, the true exchange current density could be much larger for HEMFC than for PEMFC. If so, the larger exchange current density and lower Tafel slope both suggest a better intrinsic electrocatalyst activity in HEMFCs than for PEMFCs.

FIG. 8 illustrates that the IR-free (IR for internal resistance) and MT-free (MT for mass transport) cell voltage of HEMFC is clearly higher than that of PEMFC, providing further evidence that the catalysts in HEMFC are more active than in the PEMFC.

FIG. 9 illustrates that the MT voltage loss of the HEMFC is larger than that of the PEMFC at middle-to-high current density range. This is likely due to the more demanding needs for water transport in a HEMFC, where water is both a product at the anode and a reactant at the cathode reaction, respectively. See, e.g., Jin-Soo Park, Gu-Gon Park, Seok-Hee Park et al., Macromol Symp 249-250 (1), 174 (2007).

3. Properties of SCL-TPQPOH and of SCL-TPQPOH Membranes 3.1 Solvent resistance of SCL-TPQPOH: As mentioned above, the pristine TPQPOH has excellent solubility in many ordinary solvents. However, Table 10 shows that SCL-TPQPOH loses solubility in the typical solvents.

TABLE 10

Solvent resistance of SCL-TPQPOH

| Solvent | TPQPOH[a] | SCL-TPQP0H[b] |
|---|---|---|
| Water | Insoluble | Insoluble |
| Ethanol | Soluble | Insoluble |
| DMF | Soluble | Insoluble |
| NMP | Soluble | Insoluble |

[a]DC: 50-186%
[b]DSCL: 60-95%, DC: 186%

This solvent resistance of SCL-TPQPOH can be advantageous for HEMs, considering the diversity of fuels (including low-level alcohols) for HEMFCs and long-term stability of the HEMs.

3.2 Water uptake and swelling ratio of SCL-TPQPOH: Table 11 shows the water uptake and swelling ratio of SCL-TPQPOH HEM.

TABLE 11

Water uptake and swelling ratio (60° C.) of SCL-TPQPOH

| Sample | Water uptake/% | Swelling ratio/% |
|---|---|---|
| TPQPOH186 | ~3000 | ~200 |
| SCL-TPQPOH186-DSCL0985 | 15 | |
| SCL-TPQPOH186-DSCL1470 | 9 | |
| SCL-TPQPOH186-DSCL2330 | 8 | |
| SCL-TPQPOH186-DSCL4170 | 6 | |

Here, DSCL means "degree of self-cross-linking." Because of high hydrophilicity, pristine TPQPOH186 has a water uptake of around 3000% and a swelling ratio of 200%. This very poor mechanical stability prevents pristine TPQPOH186 from practical application as an HEM in HEMFCs. However, it is apparent that self-cross linking can significantly reduce water uptake and swelling ratio by about 1-2 orders of magnitude. Thus, SCL-TPQPOH with high DCs are possibly applicable for use as HEMs. Water uptake (swelling ratio) of TPQPOH186 at 60° C. can be selected to be any value between about 98% (about 15%) and about 17% (about 6%) by choosing a DSCL between about 5% and about 40%.

3.3 Hydroxide Conductivity of SCL-TPQPOH: Table 12 shows hydroxide conductivity of SCL-TPQPOH.

TABLE 12

Hydroxide conductivity (20° C.) of SCL-TPQPOH

| Sample | Hydroxide conductivity/ MS/cm |
|---|---|
| TPQPOH186 | Can't measure |
| SCL-TPQPOH186-DSCL0532 | |
| SCL-TPQPOH186-DSCL1020 | |
| SCL-TPQPOH186-DSCL2013 | |
| SCL-TPQPOH186-DSCL404 | |

Even though conductivity decreases with increasing DSCL because IEC also decreases, SCL-TPQPOHs having lower DSCLs, e.g. 5% (05) and 10% (10), still have significantly high hydroxide conductivity, up to 20-32 mS/cm. Since as shown previously, water uptake and swelling ratio with DSCLs of approximately 5%-10% are low, e.g., 10-15%, ionomer SCL-TPQPOH186-DSCL05 and SCL-TPQPOH186-DSCL10 have an advantageous balance of high conductivity and good dimension stability. Hydroxide conductivity of TPQPOH186 at 20° C. can be selected to be any value between about 32 mS/cm and about 4 mS/cm by choosing a DSCL between about 5% and about 40%.

4. Further Polymers of this Invention

Self-cross Linked Poly(Vinylbenzyl Chloride) (SCL-PVBC) Hydroxide Exchange Membranes:

PVBC is another important commercial polymer. Because of excessively high IEC (1.5 mmol/g), pristine quaternary-phosphonium functionalized PVBC is water-soluble polymer, and accordingly, is not suitable for HEMs.

However, self-cross linking is not limited to polysulfone; it can also be applied to, at least, PVBC. Based on synthesis procedures similar to those used with PSf, SCL quaternary-phosphonium ((tris(2,4,6-trimethoxyphenyl) phosphine) functionalized PVBC, SCL-QPPVBC was readily synthesized.

SCL-QPPVBC HEMs with DSCLs of approximately 10-50% were found to have a flexible and tough membrane morphology, to exhibit good dimension stability (swelling ratio of 5-10%), and to have high hydroxide conductivity (10-40 mS/cm)).

The preferred embodiments of the invention described above do not limit the scope of the invention, since these embodiments are illustrations of several preferred aspects of the invention. Any equivalent embodiments are intended to be within the scope of this invention. Indeed, various modifications of the invention in addition to those shown and described herein, such as alternate useful combinations of the elements described, will become apparent to those skilled in the art from the subsequent description. Such modifications are also intended to fall within the scope of the appended claims. In the following (and in the application as a whole), headings and legends are used for clarity and convenience only.

Although specific features of the invention are shown in some drawings and not in others, this is for convenience only as each feature may be combined with any or all of the other features in accordance with the invention. The words "including," "comprising," "having," and "with" as used herein are to be interpreted broadly and comprehensively and are not limited to any physical interconnection. The articles "a" or "an" or the like are also to be interpreted broadly and comprehensively as referring to both the singular and the plural. Moreover, any embodiments disclosed in the subject application are not to be taken as the only possible embodiments. Other embodiments will occur to those skilled in the art and are within the following claims.

What is claimed is:

1. A highly basic ionomer comprising $[M1(-B^+)_x]_n(OH^-)_m$, wherein M1 is a polymer-forming monomer comprising an aromatic moiety or a plurality of such monomers at least one of which comprises an aromatic moiety and $B^+OH^-$ is a highly basic functional group having a $pK_b$ of between −0.2-0.2; wherein x is defined as the mole ratio of the basic group to the M1 and is between 0.01-10; n is defined as number of the repeat unit M1 and is between 10-10000; and m is the number of equilibrated moles of $OH^-$, m equals to the product of x and n.

2. The ionomer of claim 1 wherein x is between 0.1 and 2.0; and n is between 50-2000.

3. The ionomer of claim 1 wherein $B^+$ further comprise M3 configured to link M1 and $B^+$, wherein M3 is selected from —(CR'R")$_n$—, —Ar— (aromatic), and -substituted —Ar—, and wherein n is 1,2, or 3 and wherein R' and R" are independently selected from H, a halogen, a short chain alkyl, and a halogenated a short chain alkyl.

4. The ionomer of claim 1 wherein $B^+$ comprises (S1S2(S3))$X^+$, wherein one or more of S1, S2, and S3 is/are independently electron donating groups, and wherein $X^+$, is a quaternary form of X which is selected from P, As, and Sb, or tertiary form of X which is selected from S, Se and Te; and where (S3) is optional.

5. The ionomer of claim 4 wherein one or more of R1, R2, and R3 independently comprise an unshared electron pair adjacent to X or an unshared electron pair adjacent to an unsaturated system adjacent to X.

6. The ionomer of claim 4 wherein one or more of R1, R2, and R3 is independently selected from —OR, —OH, —NH$_2$, —NHR, —NR$_2$, —NHCOR, —OCOR, —SR, —SH, —R, —Br, and —I, wherein R is selected from short chain alkyl or a phenyl.

7. The ionomer of claim 4 wherein one or more of S1, S2, and S3 comprise a group selected from Ar (aromatic) and an Ar further comprising electron donating substituents.

8. The ionomer of claim 4 wherein S1 and S2 and S3 comprise (2,4,6-RO)$_3$Ph, wherein R is selected from a short chain alkyl or allyl, and wherein X comprises the elements of P, As and Sb.

9. The ionomer of claim 1 wherein M1 comprises a first repeat unit of monomer and a second repeat unit of monomer in approximately equal mol ratios.

10. The ionomer of claim 1 wherein M1 is a monomer forming one or more polymers selected from polysulfone, polystyrene, poly(ether sulfone), poly(ether sulfone)-cardo, poly(ether ketone), poly(ether ketone)-cardo, poly(ether ether ketone), poly(ether ether ketone ketone), poly(phthazinone ether sulfone ketone), polyetherimide, and poly(phenylene oxide).

11. An anion/hydroxide exchange membrane configured and sized to be suitable for use in a fuel cell and comprising an ionomer according to claim 1.

12. The membrane of claim 11 wherein the ionomer further comprises (tris(2,4,6-trimethoxyphenyl) phosphine)$_{x1}$ based quaternary phosphonium polysulfone hydroxide (TPQPOH), wherein $x^1$ is between 0 and 2.

13. The membrane of claim 12 wherein the ratio of tris(2,4,6-trimethoxyphenyl) phosphine (TTMOPP) groups bound to each polysulfone (PSf) monomer in TPQPOH is degree of chloromethylation (DC), and wherein DC is selected so that the ionic hydroxide conductivity of the membrane is greater than about 20 mS/cm.

14. The membrane of claim 12 wherein the number of tris(2,4,6-trimethoxyphenyl) phosphine (TTMOPP) groups bound to two polysulfone (PSf) ionomer chains in TPQPOH is degree of cross-linking (DSCL), and wherein DSCL is selected so that the degree of swelling is less than about 15%.

15. The membrane of claim 12 wherein degree of chloromethylation (DC) of TPQPOH is selected so that the ionic hydroxide conductivity is greater than about 40 mS/cm.

16. An anion/hydroxide exchange membrane fuel cell comprising an ionomer according to claim 1.

17. The fuel cell of claim 16 wherein the ionomer further comprises (tris(2,4,6-trimethoxyphenyl) phosphine)$_{x1}$ based quaternary phosphonium polysulfone hydroxide (TPQPOH), wherein $x^1$ is between 0 and 2.

18. A hydroxide transport membrane configured and sized to be suitable for use in a fuel cell and comprising an ionomer according to claim 1.

* * * * *